US012614322B2

(12) United States Patent   (10) Patent No.: US 12,614,322 B2
Collao Benitez et al.   (45) Date of Patent: Apr. 28, 2026

(54) SYSTEM AND METHOD FOR SELECTION OF BACKTESTING TIME AND REGION

(71) Applicant: FX Replay, Inc., Oklahoma City, OK (US)

(72) Inventors: Rodrigo A. Collao Benitez, Norman, OK (US); Matthew Concordia, Innisfil (CA); John H. Goocher, Davidson, NC (US)

(73) Assignee: FX Replay, Inc., Oklahoma City, OK (US)

( * ) Notice: Subject to any disclaimer, the term of this patent is extended or adjusted under 35 U.S.C. 154(b) by 0 days.

(21) Appl. No.: 19/319,167

(22) Filed: Sep. 4, 2025

(65) Prior Publication Data

US 2026/0004486 A1  Jan. 1, 2026

Related U.S. Application Data

(63) Continuation of application No. 19/183,609, filed on Apr. 18, 2025.

(60) Provisional application No. 63/635,712, filed on Apr. 18, 2024.

(51) Int. Cl.
*G06T 11/26* (2026.01)
*G06Q 40/04* (2012.01)

(52) U.S. Cl.
CPC .............. *G06T 11/26* (2026.01); *G06Q 40/04* (2013.01)

(58) Field of Classification Search
CPC .............................. G06T 11/206; G06Q 40/04
See application file for complete search history.

(56) References Cited

U.S. PATENT DOCUMENTS

| 8,346,646 B2 | 1/2013 | Cutler et al. | |
| 10,984,016 B2 | 4/2021 | Gunther | |
| 11,373,244 B2 * | 6/2022 | Nadler | G06Q 40/06 |
| 2018/0342014 A1 * | 11/2018 | Peretz | G06Q 40/04 |

OTHER PUBLICATIONS

Discord Communication by user MartiiinW dated May 25, 2023.
FX Replay, Replay Report, March Wrap Up Newsletter, transmitted Apr. 1, 2025.

* cited by examiner

*Primary Examiner* — Matthew Salvucci
(74) *Attorney, Agent, or Firm* — DUNLAP CODDING, P.C.

(57) ABSTRACT

A system is disclosed, comprising a processor and a memory. The memory stores instructions causing the processor to: generate a backtesting session view comprising a graph having a time axis and a historic instrument value axis, the view displaying a historic instrument mapped on the graph until a first simulation time; receive a first input indicative of a user selecting a jump from a goto menu, the jump being one of a next session jump, a next-day open jump, and a next silver bullet session jump, each jump associated with a goto option stored in the memory and having an indicator and a goto time value; advance the first simulation time until the first simulation time is equal to a next goto time value of a particular goto option having an activated indicator; and draw, in the view, the historic instrument on the graph up to the second simulation time.

19 Claims, 10 Drawing Sheets

SYSTEM AND METHOD FOR SELECTION OF BACKTESTING TIME AND REGION

CROSS-REFERENCE TO RELATED APPLICATIONS

This application is a continuation of U.S. patent application Ser. No. 19/183,609 filed Apr. 18, 2025, which claims priority to U.S. Provisional Patent Application No. 63/635,712, filed Apr. 18, 2024, the entire contents of which are hereby incorporated herein by reference in their entirety.

BACKGROUND

In the realm of financial markets, investors and analysts strive to develop strategies that maximize returns while minimizing risk. A common practice in the industry is the utilization of backtesting, a process where trading strategies are applied to historical data to gauge potential performance and viability.

However, these traditional backtesting methodologies have several inherent limitations. A user of traditional backtesting methodologies may want to compare varying trading strategies as the trading strategies would perform over the course of days, months, or even years. Further, the user may want to quickly navigate through historical data to view a position at important times during the trading simulation; however, it is time-consuming to wait for traditional backtesting methodologies to progress through the historic market instrument.

Therefore, a need exists for an improved backtesting system that addresses these limitations.

SUMMARY

The problem of quickly navigating through historical data to view a position at important times during the trading simulation is solved by the systems and methods herein disclosed. The systems and methods include a system comprising a processor and a memory. The memory comprises a non-transitory processor-readable medium storing processor-executable instructions that when executed by the processor, causes the processor to: generate a backtesting session view for a backtesting session comprising a historic market instrument mapped on a graph. The graph has an axis of abscissas corresponding to a time and an axis of ordinates corresponding to a value of the historic market instrument. The backtesting session view has a first simulation time and displays the historic market instrument mapped on the graph up to the first simulation time. The processor further receives a first input indicative of a user selecting a goto jump from a goto menu. The goto jump being one or more of a next session jump, a next day open jump, and a next silver bullet session jump. Each goto jump is associated with at least one session goto option stored in the memory and having an activation indicator and a goto time value. The processor also advances the first simulation time until the first simulation time is equal to a next nearest goto time value associated with a particular session goto option having the activation indicator of activated. The processor further draws, in the backtesting session view, the historic market instrument mapped on the graph up to the second simulation time.

The systems and methods also include a system comprising an input device operable to receive an input from a user, an output device, a processor in communication with the input device and the output device, and a memory. The memory comprises a non-transitory processor-readable medium storing processor-executable instructions that when executed by the processor, causes the processor to generate a backtesting session view for a backtesting session on the output device. The backtesting session view comprises a historic market instrument having a time-series data of a market instrument value and a timestamp mapped on a graph. The graph has an axis of abscissas corresponding to a time and an axis of ordinates corresponding to a value of the historic market instrument. The backtesting session view has a first simulation time and displays the historic market instrument mapped on the graph up to the first simulation time. The processor also receives a first input, via the input device, indicative of a user selecting a goto jump being a price jump. The price jump has a target price. The processor also advances the first simulation time until the value of the historic market instrument reaches the target price and selects the timestamp of the historic market instrument at the target prices as the second simulation time. The processor further draws, in the backtesting session view on the output device, the historic market instrument mapped on the graph up to the second simulation time.

In some embodiments, the system further comprises the memory further comprises processor-executable instructions that cause the processor to further receive the first input indicative of the user selecting the goto jump being the price jump, the price jump having the target price and a maximum skip time, and advance the first simulation time to a second simulation time until at least one of: the value of the historic market instrument reaches the target price and the first simulation time has been advanced by the maximum skip time.

The systems and methods further include a system comprising a processor and a memory. The memory comprises a non-transitory processor-readable medium storing processor-executable instructions that when executed by the processor, causes the processor to generate a backtesting session view for a backtesting session comprising a historic market instrument having a time-series data of a market instrument value and a timestamp mapped on a graph. The graph has an axis of abscissas corresponding to a time and an axis of ordinates corresponding to a value of the historic market instrument. The backtesting session view has a first simulation time and displays the historic market instrument mapped on the graph up to the first simulation time. The processor also receives a first input indicative of a user selecting a goto jump being a position close jump. The position close jump is associated with a position taken in the historic market instrument. The position includes at least a take profit value and a stop loss value. The processor also advances the first simulation time until the value of the historic market instrument causes the position to meet at least one of the take profit value and the stop loss value, and selects the timestamp of the historic market instrument as the second simulation time. The processor further draws, in the backtesting session view, the historic market instrument mapped on the graph up to the second simulation time.

The foregoing Summary provides an overview of certain selected implementations or embodiments disclosed herein, and is not intended to describe every aspect, embodiment, implementation, feature, or advantage of the disclosure exhaustively or comprehensively. Therefore, this Summary should not be construed in such a way to limit the scope of this disclosure or to limit the scope of the claims. The details of one or more implementation or embodiment disclosed herein are set forth in the accompanying drawings and descriptions below. Other aspects, features, implementations, embodiments, and advantages will become readily apparent in view of the description, the drawings, and the claims set forth herein.

Implementations of the above techniques include methods, apparatus, systems, and computer program products are described. One such computer program product is suitably embodied in a non-transitory computer-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features and advantages will become apparent from the description, the drawings, and the claims.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
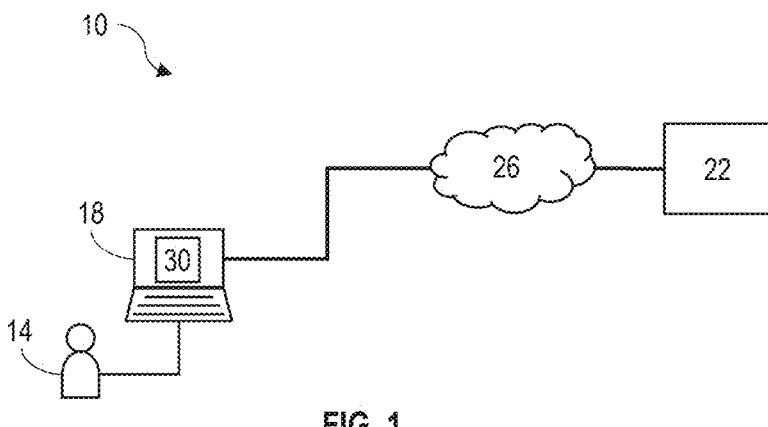
FIG. 1 is a diagram of an exemplary embodiment of hardware forming a system constructed in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted. The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure, or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the disclosure as described herein. Where a range of numerical values is stated herein as being less than a stated value, the range is nevertheless bounded on its lower end by a non-zero value. It is not intended that the scope of the disclosure be limited to the specific values recited when defining a range. All ranges are inclusive and combinable.

Circuitry, as used herein, may be analog and/or digital components, or one or more suitably programmed processors (e.g., microprocessors) and associated hardware and software, or hardwired logic. Also, "components" may perform one or more functions. The term "processing component," may include hardware, such as a processor (e.g., microprocessor), an application specific integrated circuit (ASIC), a field programmable gate array (FPGA), a combination of hardware and software, software, and/or the like. The term "processor" as used herein means a single processor or multiple processors working independently or together to collectively perform a task.

Software may include one or more computer readable instruction that when executed by one or more component, e.g., a processor, causes the component to perform a specified function. It should be understood that the algorithms described herein may be stored on one or more non-transitory computer-readable medium. Exemplary non-transitory computer-readable media may include a non-volatile memory, a volatile memory, a random-access memory (RAM), a read only memory (ROM), a CD-ROM, a hard drive, a solid-state drive, a flash drive, a memory card, a DVD-ROM, a Blu-ray Disk, a laser disk, a magnetic disk, an optical drive, a phase change memory, combinations thereof, and/or the like. Such non-transitory computer-readable media may be electrically based, optically based, magnetically based, material-phase based, resistive based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

As used herein, the term 'backtesting' is a method used by investors, traders, and/or financial analysts to evaluate potential performance of a trading strategy or investment model using historical securities trading data/historic market instruments. During backtesting, the trading strategy is applied to a past set of data (such as stock/security trading data) to ascertain how the trading strategy would have performed over a specified period of time. Backtesting involves simulating a historic market instrument as though it was presently being traded, such as in the stock market. The user is provided with an ability to make trades (positions and orders such as limit and stop orders) against the historic data in a simulation time (optionally, corresponding to a historic time for a market that has already closed) and then analyze backtesting results to identify potential trends, risks, and returns. Thus, backtesting helps in refining trading strategies and in identifying potential strengths and weaknesses of those trading strategies before implementing the trading strategies in real-time trading. The past set of data for each historic market instrument, or financial instrument, may be referred to as historical data. The historical data may include granular price data for the market instrument, such as a timestamp and a market value.

Referring now to the drawings, and in particular to FIG. 1, shown therein is a diagram of an exemplary embodiment of a backtesting system 10 constructed in accordance with the present disclosure. A user 14 may interact i.e., two way-communications, with the backtesting system 10 using a user device 18 that may be used to interact with a backtesting device 22. The user device 18 may communicate with the backtesting device 22 via a network 26. In one embodiment, the user 14 may have a user profile that allows the user 14 to access the backtesting device 22 via the user device 18 on which the particular user 14 is signed in.

In some embodiments, the network 26 may be the Internet and/or other network. For example, if the network 26 is the Internet, a primary user interface 30 (described below in more detail) of the backtesting system 10 may be delivered through a series of web pages or private internal web pages of a company or corporation, which may be written in hypertext markup language (HTML/PHP/JavaScript), for example, and may be accessible by the user device 18. It should be noted that the primary user interface 30 of the backtesting system 10 may be another type of interface including, but not limited to, a Windows-based application, a server-based application, a tablet-based application, a mobile web interface, an application running on a mobile device, a virtual-reality interface, an augmented-reality interface, and/or the like.

The network 26 may be almost any type of network. For example, in some embodiments, the network 26 may be a version of an Internet network (e.g., exist in a TCP/IP-based network). In one embodiment, the network 26 is the Internet. It should be noted, however, that the network 26 may be almost any type of network and may be implemented as the World Wide Web (or Internet), a local area network (LAN), a wide area network (WAN), an LPWAN, a LoRa network, a metropolitan network, a wireless network, a WiFi network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, a short-wave wireless network, a long-wave wireless network, combinations thereof, and/or the like. It is conceivable that in the near future, embodiments of the present disclosure may use more advanced networking topologies.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of backtesting system 10 may perform one or more functions described as being performed by another one or more of the devices of the backtesting system 10. Devices of the backtesting system 10 may interconnect via wired connections, wireless connections, or a combination thereof.

Figure 2:
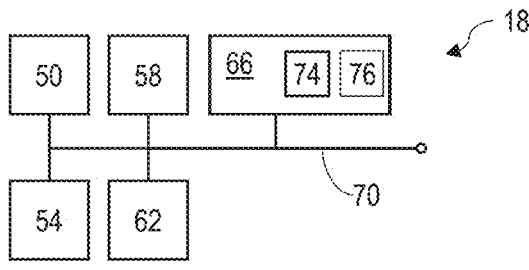
FIG. 2 is a diagram of an exemplary embodiment of a user device for use in the system of FIG. 1 constructed in accordance with the present disclosure.

Referring now to FIG. 2, shown therein is a diagram of an exemplary embodiment of the user device 18 of the backtesting system 10 constructed in accordance with the present disclosure. In some embodiments, the user device 18 may include, but is not limited to, implementations as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the user device 18 may include one or more input device 50 (hereinafter "input device 50"), one or more output device 54 (hereinafter "output device 54"), one or more processing component 58 (hereinafter "user processor 58"), one or more communication device 62 (hereinafter "communication device 62") capable of interfacing with the network 26, one or more memory 66 (hereinafter "user memory 66") storing processor-executable code and/or user application(s) 74 (hereinafter "user application 74"). The user application 74 may include, for example, a web browser capable of accessing a website and/or communicating information and/or data over a wireless or wired network (e.g., the network 26), and/or the like. The input device 50, output device 54, user processor 58, communication device 62, and user memory 66 may be connected via a path 70 such as a data bus that permits communication among the components of user device 18.

The user processor 58 may be implemented as a single processor or multiple processors working together, or independently, to execute the user application 74 as described herein. It is to be understood, that in certain embodiments using more than one user processor 58, the user processors 58 may be located remotely from one another, located in the same location, or comprising a unitary multi-core processor. The user processors 58 may be capable of reading and/or executing processor-executable code and/or capable of creating, manipulating, retrieving, altering, and/or storing data structures into the user memory 66.

Exemplary embodiments of the user processor 58 may include, but are not limited to, a digital signal processor (DSP), a central processing unit (CPU), a field programmable gate array (FPGA), a graphics processing unit (GPU), a neural processing unit (NPU), a microprocessor, a multi-core processor, an application specific integrated circuit (ASIC), combinations thereof, and/or the like, for example. The user processor 58 may be capable of communicating with the user memory 66 via the path 70 (e.g., data bus). The user processor 58 may be capable of communicating with the input device 50 and/or the output device 54. The user processor 58 may include one or more user processor 58 working together, or independently, and located locally, or remotely, e.g., accessible via the network 26.

The user memory 66 may be one or more non-transitory processor-readable medium. The user memory 66 may store the user application 74 that, when executed by the user processor 58, causes the user device 18 to perform an action such as communicate with or control one or more component of the user device 18 and/or, via the network 26, the backtesting device 22. The user memory 66 may be one or more user memory 66 working together, or independently, to store processor-executable code and may be located locally or remotely, e.g., accessible via the network 26.

The input device 50 may be capable of receiving information input from the user 14 and/or user processor 58, and transmitting such information to other components of the user device 18 and/or the network 26. The input device 50 may include, but is not limited to, implementation as a keyboard, a touchscreen, a mouse, a trackball, a microphone, a camera, a fingerprint reader, an infrared port, an optical port, a cell phone, a smart phone, a PDA, a remote control, a fax machine, a wearable communication device, a network interface, combinations thereof, and/or the like, for example. The input device 50 may include the primary user interface 30 on the user device 18.

The output device 54 may be capable of outputting information in a form perceivable by the user 14 and/or user processor 58. Implementations of the output device 54 may include, but are not limited to, a computer monitor, a screen, a touchscreen, a speaker, a website, a television set, a smart phone, a PDA, a cell phone, a fax machine, a printer, a laptop computer, a haptic feedback generator, an olfactory generator, combinations thereof, and the like, for example. It is to be understood that in some exemplary embodiments, the input device 50 and the output device 54 may be implemented as a single device, such as, for example, a touchscreen of a computer, a tablet, or a smartphone. It is to be further understood that as used herein the term user (e.g., the user 14) is not limited to a human being, and may comprise a computer, a server, a website, a processor, a network interface, a user terminal, a virtual computer, combinations thereof, and/or the like, for example.

The communication device 62, in communication with the user processor 58, may interface with the network 26. The network 26 may permit bi-directional communication of information and/or data between the user device 18 and/or the backtesting device 22. The network 26 may interface with the backtesting device 22 and/or the user device 18 in a variety of ways. For example, in some embodiments, the network 26 may interface by optical and/or electronic interfaces, and/or may use a plurality of network topographies and/or protocols including, but not limited to, Ethernet, UDP/TCP/IP, circuit switched path, combinations thereof, and/or the like, as described above. For example, the user processor 58 may be capable of communicating via the network 26 by exchanging signals (e.g., analog, digital, optical, and/or the like) via one or more port (e.g., physical or virtual ports) using a network protocol to provide updated information to the backtesting device 22 (e.g., to a backtesting application 90 (described below) executed on the backtesting device 22).

Figure 3:
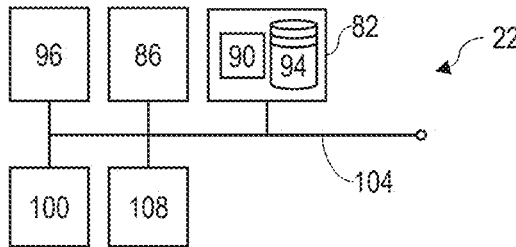
FIG. 3 is a diagram of an exemplary embodiment of a backtesting device of the system of FIG. 1 constructed in accordance with the present disclosure.

Referring now to FIG. 3, shown therein is a diagram of an exemplary embodiment of the backtesting device 22 constructed in accordance with the present disclosure. The backtesting device 22 may include one or more device that execute(s) one or more application or service in a manner described herein. In the illustrated embodiment, the backtesting device 22 is provided with a memory 82 (hereinafter "backtesting memory 82") accessible by one or more processing component 86 (hereinafter "backtesting processor 86"). The backtesting memory 82 may include one or more non-transitory computer-readable medium storing processor-executable code and/or software application(s) 90 (hereinafter "backtesting application 90") and one or more database 94 (hereinafter "database 94").

In one embodiment, the database 94 can be a relational database, a time-series database, a vector database, a non-relational database, or the like. Examples of such databases comprise, DB2®, Microsoft® Access, Microsoft® SQL Server, Oracle®, MySQL, PostgreSQL, MongoDB, Apache Cassandra, Weaviate, and the like. It should be understood that these examples have been provided for the purposes of illustration only and should not be construed as limiting the presently disclosed inventive concepts. The database 94 can be centralized or distributed across multiple systems. The backtesting memory 82 may further store, for example, the historical/past data for a plurality of market instruments. In some embodiments, the historical data may be stored, for example, in the database 94. In some embodiments, the backtesting memory 82 may store data for each backtesting session being executed by user(s) 14 on the backtesting device 22. In some embodiments, the data for each backtesting session may be stored in an in-memory datastore/database. Exemplary in-memory datastores may include, e.g., REDIS® (Redis Ltd., San Francisco, CA, USA). In one embodiment, the database 94 may include a first database storing user data and/or session data and a second database storing the historical data.

In some embodiments, the backtesting device 22 may comprise the one or more backtesting processor 86 working together, or independently to, execute processor-executable code, such as the backtesting application 90, stored on the backtesting memory 82. Additionally, the backtesting device 22 may include at least one input device 96 (hereinafter "input device 96") and at least one output device 100 (hereinafter "output device 100"). Each element of the backtesting device 22 may be partially or completely network-based or cloud-based, and may or may not be located in a single physical location.

The backtesting processor 86 may be implemented as a single processor or multiple processors working together, or independently, to execute the backtesting application 90 as described herein. It is to be understood, that in certain embodiments using more than one backtesting processor 86, the backtesting processors 86 may be located remotely from one another, located in the same location, or comprising a unitary multi-core processor. The backtesting processors 86 may be capable of reading and/or executing processor-executable code and/or capable of creating, manipulating, retrieving, altering, and/or storing data structures into the backtesting memory 82 such as in the database 94.

Exemplary embodiments of the backtesting processor 86 may be constructed similar to and in accordance with the user processor 58 described above in more detail. The backtesting processor 86 may be capable of communicating with the backtesting memory 82 via a path 104 (e.g., data bus). The backtesting processor 86 may be capable of communicating with the input device 96 and/or the output device 100.

The backtesting processor 86 may be further capable of interfacing and/or communicating with the user device 18 via the network 26 using a communication device 108. For example, the backtesting processor 86 may be capable of communicating via the network 26 by exchanging signals (e.g., analog, digital, optical, and/or the like) via one or more port (e.g., physical or virtual ports) using a network protocol to provide updated information to the user application 74 or the primary user interface 30 executed on the user device 18.

In some embodiments, the backtesting memory 82 may be located in the same physical location as the backtesting device 22, and/or one or more backtesting memory 82 may be located remotely from the backtesting device 22. For example, the backtesting memory 82 may be located remotely from the backtesting device 22 and communicate with the backtesting processor 86 via the network 26. Additionally, when more than one backtesting memory 82 is used, a first backtesting memory 82 may be located in the same physical location as the backtesting processor 86, and additional backtesting memory 82 may be located in a location physically remote from the backtesting processor 86. Additionally, the backtesting memory 82 may be implemented as a "cloud" non-transitory processor-readable medium (i.e., one or more backtesting memory 82 may be partially or completely based on or accessed using the network 26).

The backtesting memory 82 may store processor-executable code and/or information comprising the database 94 and the backtesting application 90. In some embodiments, the backtesting application 90 may be stored as a compiled application file, such as an executable file, for example, or in a structure (or unstructured) format, such as, e.g., in a non-compiled file.

The input device 96 of the backtesting device 22 may transmit data to the backtesting processor 86 and may be constructed in accordance with or similar to the input device 50 of the user device 18 described above in more detail. The input device 96 may be located in the same physical location as the backtesting processor 86, or located remotely and/or partially or completely network-based. The output device 100 of the backtesting device 22 may transmit information from the backtesting processor 86 to the user 14, and may be similar to the output device 54 of the user device 18. The output device 100 may be located with the backtesting processor 86, or located remotely and/or partially or completely network-based.

Figure 4:
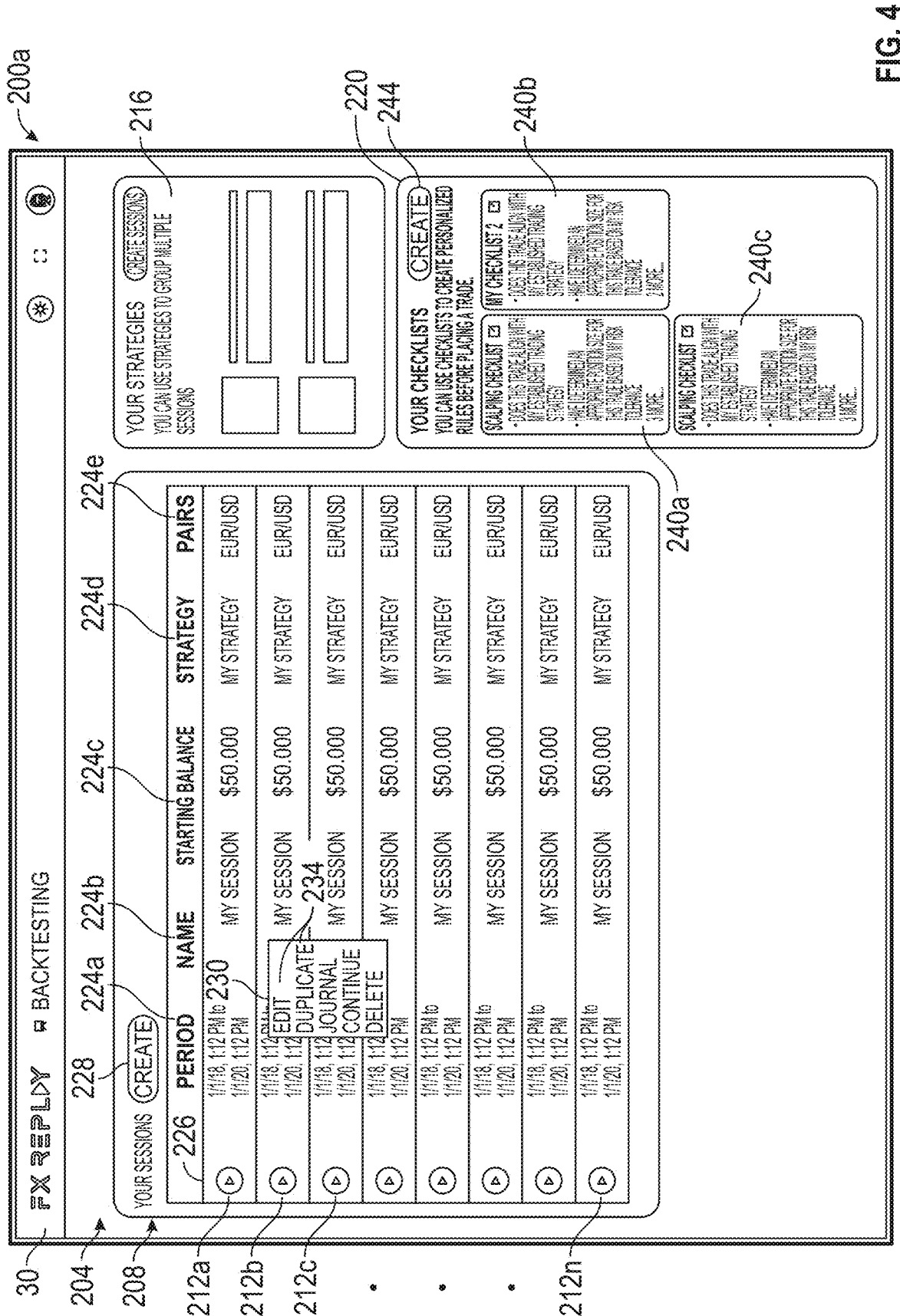
FIG. 4 is a screenshot of an exemplary embodiment of the user device displaying a primary user interface with a backtesting dashboard constructed in accordance with the present disclosure.

Referring now to FIG. 4, shown therein is an illustration of a first screenshot 200a of an exemplary embodiment of the user device 18 displaying the primary user interface 30 with a backtesting dashboard 204 constructed in accordance with the present disclosure. As shown by the first screenshot 200a, the user processor 58 may display the primary user interface 30 of the backtesting application 90 on the user device 18 to display a backtesting session list 208 having one or more backtesting item 212a-n associated with a particular backtesting session, a strategy group 216, and a checklist group 220.

In one embodiment, the backtesting dashboard 204 may be generated by the backtesting processor 86 and may be transmitted by the backtesting processor 86 to the user processor 58 via the network 26. For example, the backtesting dashboard 204 may be a series of web pages or a web application that is generated by the backtesting processor 86 and displayed on the primary user interface 30 on the output device 54 of the user device 18 by the user processor 58.

The backtesting session list 208 may display a list of one or more of the backtesting items 212, for which each backtesting item 212 may be associated with a particular backtesting session. The backtesting session list 208 may display the list of all backtesting items 212 for the user, or, in other embodiments, may display a list of a subset of the backtesting items 212 for the user.

As shown in FIG. 4, each backtesting item 212 includes one or more backtesting property label 224 corresponding to a respective backtesting property, for example, shown as a period label 224a, a name label 224b, a starting balance label 224c, a strategy label 224d, and a pairs label 224e. In other embodiments, additional backtesting property labels 224 may be provided. Each backtesting property label 224 may correspond to a backtesting property of the backtesting session. The period label 224a may be a simulation time-frame that a particular backtesting session includes or is executed over, which corresponds to a historic date/time of the historic market instrument. The name label 224b may be a name of the particular backtesting session. The starting balance label 224c may be a starting balance of the particular backtesting session. The strategy label 224d may correspond to a strategy name of a particular strategy in the strategy group 216. The pairs label 224e may refer to any financial instrument or asset available within the particular backtesting session and may correspond to the historic market instrument being examined as part of the particular back-testing session. For example, the pair of instruments may encompass two or more assets, such as one or more financial instruments. The one or more financial instruments may include, for example, stocks, bonds, currency (e.g., United States Dollar (USD), Euro (EUR), and the like), commodities (e.g., gold and silver), and/or any other tradable asset. While each backtesting item 212 is shown with a currency pair associated with the pairs label 224e (e.g., shown with EUR/USD), the pairs are not limited to currency pairs alone and may encompass a wide range of assets or financial instruments that the user desires to analyze.

In one embodiment, each of the one or more backtesting properties are included in the session data and correspond to the backtesting property labels 224 for the associated back-testing session may be stored in the backtesting memory 82, such as in the database 94, and may be associated with the particular backtesting session.

In one embodiment, each backtesting item 212 includes a view input 226. The backtesting processor 86 may receive one or more input from the user device 18 indicative of selection of the view input 226 of a particular backtesting item 212 by the user, and, responsive to the selection, may cause the primary user interface 30 to replay the associated backtesting session of the particular backtesting item 212. For example, the backtesting processor 86, responsive to one or more input, e.g., from the user device 18, may cause the primary user interface 30 to display a backtesting session view 300 (shown in FIG. 5A) and be loaded with session data of the associated backtesting session sent to the user processor 58.

In one embodiment, the backtesting processor 86 may receive one or more input from the user device 18 indicative of the user selecting a create input 228. Responsive to the selection of the create input 228, the backtesting processor 86 may generate a new backtesting session.

In one embodiment, the backtesting processor 86 may generate a backtesting item context menu 230 (FIG. 4) responsive to receiving an input from the user via the user device 18. For example, if the user right-clicks (or hold-clicks) a particular backtesting item 212, the backtesting processor 86 may generate the backtesting item context menu 230 having one or more context menu operations 234 operable to, upon selection by the user via the user device 18, cause the backtesting processor 86 to execute a particular function against the backtesting session associated with the particular backtesting item 212. In one embodiment, the one or more context menu operations 234 include operations that when executed by the backtesting processor 86 may cause the backtesting processor 86 to: edit the backtesting session; duplicate the backtesting session; view the journal of the backtesting session; continue the backtesting session; and delete the backtesting session. For example, upon selection of the "Continue" context menu operation 234, the back-testing processor 86, responsive to the selection, e.g., from the user device 18, may cause the primary user interface 30 to display the backtesting session view 300 (shown in FIG. 5A) loaded with session data of the backtesting session associated with the particular backtesting item 212.

In one embodiment, the backtesting dashboard 204 may further include the strategy group 216. The strategy group 216 may include one or more session collection having a strategy name and associated with one or more backtesting session. In one embodiment, the one or more backtesting session is mutually exclusive between session collections, that is, each backtesting session can only be associated with one session collection. In other embodiments, each back-testing session can be associated with more than one session collection. As shown, each backtesting item 212 may display the strategy label 224d comprising the strategy name of the session collection of which the backtesting session associated with the backtesting item 212 is a member.

In one embodiment, the backtesting dashboard 204 may further include the checklist group 220. The checklist group 220 may display one or more checklist 240a-n (shown as a first checklist 240a, a second checklist 240b, and a third checklist 240c). Each checklist 240 may be created and customized by the user. In one embodiment, the checklist 240 may be used as a reminder of one or more step that the user has identified as important to follow before the user places an order. Upon selection of a particular checklist 240, the backtesting processor 86 may prompt the user to update or edit the particular checklist 240. In one embodiment, the checklist group 220 may further comprise a new checklist input 244. The backtesting processor 86, responsive to the user selecting the new checklist input 244 may generate a checklist dialog.

Figure 5A:
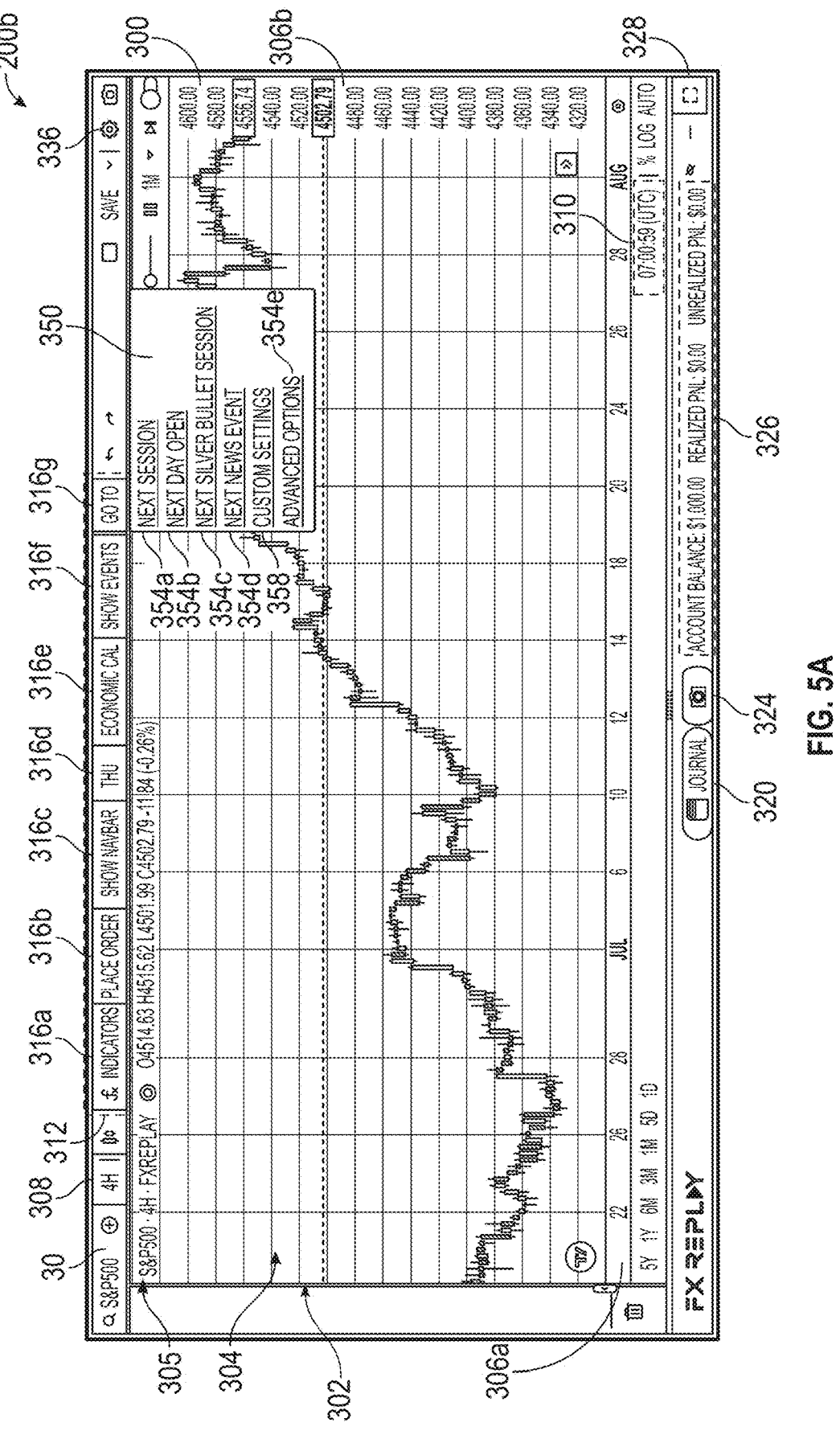
FIG. 5A is an illustration of a screenshot of an exemplary embodiment of the user device displaying a primary user interface with a backtesting session view constructed in accordance with the present disclosure.

Referring now to FIG. 5A, shown therein is an illustration of a second screenshot 200b of an exemplary embodiment of the user device 18 displaying the primary user interface 30 with a backtesting session view 300 displayed and con-structed in accordance with the present disclosure. Gener-ally, the backtesting session view 300 displays a backtesting session, such as the backtesting session associated with a particular backtesting item 212 selected by the user 14 from the backtesting dashboard 204.

As shown, the backtesting session view 300 includes a chart 302 having a graph 304, such as a candlestick line graph, showing a value of a historic market instrument 305 (e.g., historical stock data for a stock, financial market, or foreign exchange market that is at least one market-day old, or from a prior market-day) and having an axis of abscissas 306a showing a time, and an axis of ordinates 306b showing a market instrument value. The backtesting session view 300 provides the user with a time granularity 308 of a ticker step corresponding to a timeframe for which each candlestick of the graph 304 of the historic market instrument 305 pertains, as well as an option menu 312 having one or more option 316a-n, shown as options 316a-g, described in detail below. While the time granularity 308 is shown as having a value of 4 hours, it should be understood that other time granu-larities of the ticker step may be selectable by the user 14, for example, the time granularity 308 may have options including, but not limited to, 1 second, 5 seconds, 15 seconds, 30 seconds, 1 minute, 5 minutes, 15 minutes, 30 minutes, 1 hours, 4 hours, 8 hours, 12 hours, 1 day, 7 days, 1 week, 1 month, 1 year, and the like, or any value therebetween in 1 second increments. Upon receiving an indication of selection of a particular value of the time granularity 308 by the user 14, the user processor 58 may store the particular value as the time granularity of the graph 304 in the session data.

In one embodiment, the historic market instrument 305 may be, for example, a time-series data having the market instrument value associated with a particular time value. The historic market instrument 305 may be provided with time granularity 308 within the graph 304 where the time granularity 308 is a time delta between consecutive market instrument values in the time-series data. For example, the historic market instrument 305 may have a time granularity 308 of 5 minutes, resulting in the time-series data providing market instrument values in 5-minute increments. In one embodiment, the backtesting processor 86 may calculate the market instrument value for a particular time granularity 308. For example, the historic market instrument 305 may be stored in the backtesting memory 82, such as from the database 94, at a first time granularity, such as a first market instrument value for each 0.25-second increment, and the backtesting processor 86 may calculate a second market instrument value at a second time granularity, e.g., for each 5-minute increment, such as, by a high value, low value, beginning value, and ending value of the first market instrument value at each 0.25-second increment within the 5-minute increment as the second market instrument value.

In one embodiment, the backtesting processor 86 may retrieve the value of the historic market instrument 305 from the backtesting memory 82, such as from the database 94. In one embodiment, the database 94 storing the historic market instrument values is a non-relational database and/or a time-series database. The value of the historic market instrument 305 may be, for example, stored with, or associated with, the session data.

In one embodiment, the graph 304 may show historic market instrument values for the historic market instrument 305 that have a time value at, or before, a simulation time 310. For example, as shown in FIG. 5A, the simulation time 310 is shown as "07:00:59 (UTC)" and the primary user interface 30 with the backtesting session view 300 loaded with session data of the associated backtesting session may show the market instrument values for the historic market instrument 305 only up to the market instrument values having a time value at or before the simulation time 310 of 07:00:59 (UTC), and may not, for example, display the market instrument values having the time value greater than the simulation time 310. As used herein, reference to "prior market instrument value", or the like, refers to market instrument values of the historic market instrument 305 prior to the simulation time 310 and within a timeframe of the chart 302. Further, it should be understood that while the chart 302 only shows the graph 304 of the market instrument values of the historic market instrument 305 having the time value up to and including the simulation time 310, the simulation data of the associated backtesting session may include the time-series data of the historic market instrument 305 for a duration of the associated backtesting session, which includes, for example, market instrument values of the historic market instrument 305 having a time value greater than the simulation time 310.

In one embodiment, the option menu 312 may include an indicator option 316a, a place order option 316b, a hide navbar option 316c, a day option 316d (shown as 'Thu' indicating 'Thursday'), an economic calendar option 316e, a show events option 316f, and a goto option 316g. In one embodiment, the indicator option 316a, when selected by the user, causes the user processor 58 to display one or more indicators on the chart 302. In one embodiment, the place order option 316b, when selected by the user, causes the user processor 58 to display a place order dialog on the primary user interface 30. In one embodiment, the hide navbar option 316c, when selected by the user, causes the user processor 58 to hide the option menu 312 from the display on the chart 302. In one embodiment, the day option 316d, when selected by the user, causes the user processor 58 to toggle a "day of week" modal, e.g., when a cursor is within the chart 302 or over the historic market instrument 305 of the graph 304. In one embodiment, the economic calendar option 316e, when selected by the user, causes the user processor 58 to display an economic calendar drawer operable to display an economic calendar for one or more country. In one embodiment, the show events option 316f, when selected by the user, causes the user processor 58 to display one or more event of the economic calendar in the chart 302 and/or on the graph 304.

In one embodiment, the goto option 316g, when selected by the user, causes the user processor 58 to display a goto menu 350 on the primary user interface 30. As shown, the goto menu 350 may have one or more type of goto jumps 354, such as a Next Session jump 354a, a Next Day Open jump 354b, a Next Silver Bullet Session jump 354c, a Next News Event jump 354d, and a Custom settings menu selection 358. It should be understood that the goto jumps 354 listed above and identified in FIG. 5A are provided by way of example only and that the goto jumps 354 are not limited to these specific implementations. For example, additional goto jump 354 implementations may include goto jumps 354 corresponding to a previous significant event jump, wherein the system identifies and navigates to the nearest prior occurrence of a predefined trading condition, such as a high volatility spike, liquidity sweep, major support interaction, and/or major resistance interaction. Further, the goto jump 354 may include a session-defined event jump, wherein upon selection of the session-defined event jump, the backtesting processor 86 calculates a jump target based on user-specified trading sessions or time-based conditions. The user 14 may provide inputs (such as user-specified trading sessions, time-based conditions, and/or significant event settings/selections) to the user processor 58 and/or the backtesting processor 86, e.g., via selection of an advanced options 354e from the goto menu 350.

In one embodiment, each goto jump 354 may be dynamically calculated based upon the simulation time 310, the type of the goto jump 354, and user configuration, instead of corresponding to a predetermined date-timestamp within the simulation timeframe. In this way, neither the user processor 58 nor the backtesting processor 86 generates predetermined timestamps for each goto jump 354, thereby improving efficiency of the backtesting system 10, e.g., of the user device 18 and the backtesting device 22.

In one embodiment, the backtesting session view 300 includes a show journal input 320 operable to cause the user processor 58 to display a one or more journal entry or journal screenshot as described in U.S. application Ser. No. 18/915,708 entitled "Security Trading Backtesting System Having an Interactable Journal" filed on Oct. 15, 2024, the entire content of which is hereby incorporated herein by reference in its entirety.

In one embodiment, the backtesting session view 300 may further include a session balance 326 showing an account balance for the backtesting session, a realized profit and loss for the backtesting session, and an unrealized profit and loss for the backtesting session.

In one embodiment, the backtesting session view 300 may further include a display setting selector 328 operable to, when selected by the user via the primary user interface 30, cause the user processor 58 to modify a display size of the chart 302 and/or the graph 304.

In one embodiment, the backtesting session view 300 may further include a user settings menu 336 operable to display, on the primary user interface 30, an icon associated with a logged-in user account 76 for the user 14 and a settings menu. The user's user account 76 may include account information, such as a user's name, an email address, a username, custom settings, account properties, and/or the like.

In one embodiment, the Custom settings menu selection 358, when selected by the user via the primary user interface 30, causes the user processor 58 to display a custom settings dialog 400 (FIG. 5B, described below) on the primary user interface 30, for example, superimposed over the graph 304 of the backtesting session view 300.

Figure 5B:
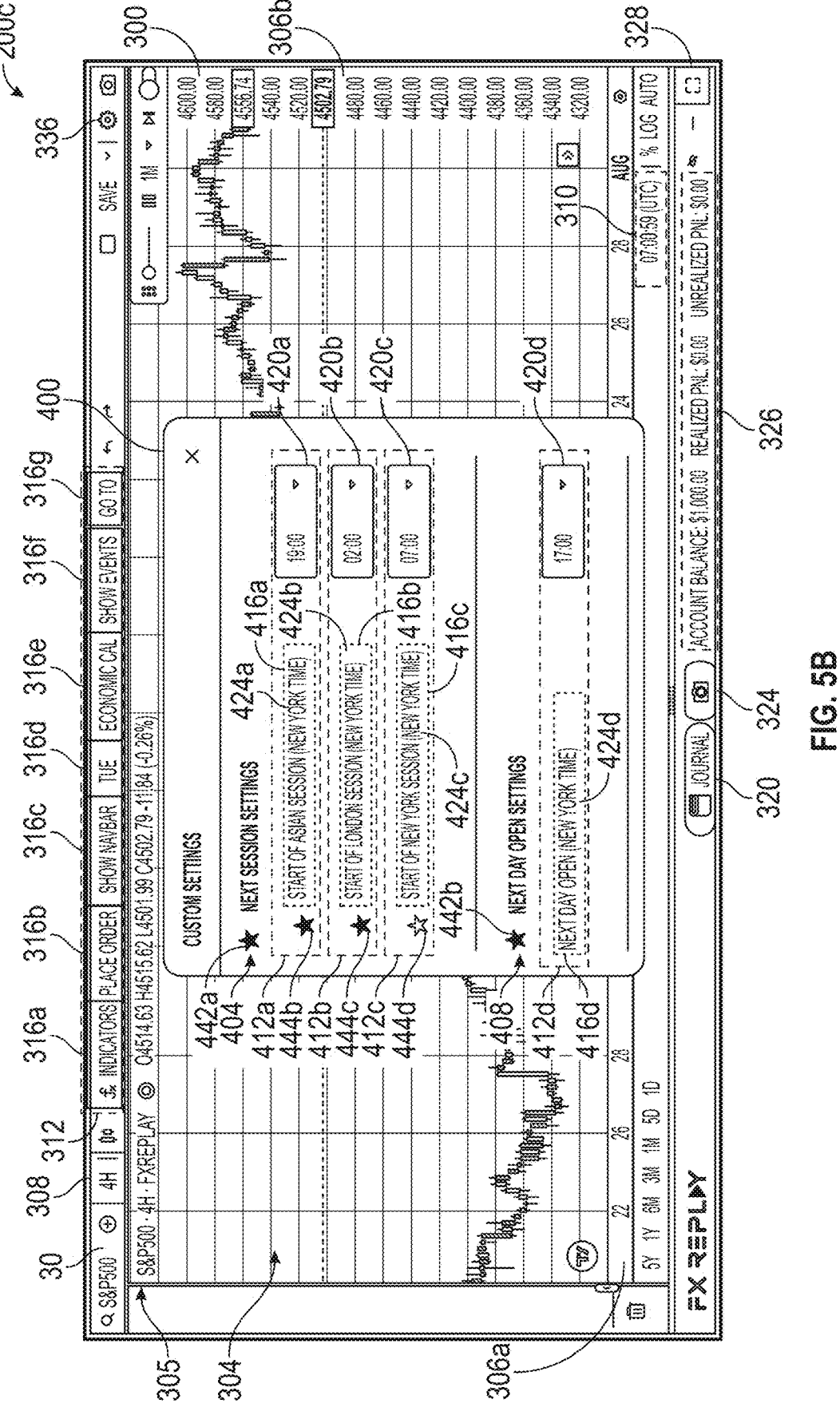
FIG. 5B is an illustration of a screenshot of an exemplary embodiment of the user device displaying the primary user interface with a custom settings dialog constructed in accordance with the present disclosure.

Referring now to FIG. 5B, shown therein is an illustration of a third screenshot 200c of an exemplary embodiment of the user device 18 displaying the primary user interface 30 with the custom settings dialog 400 displayed and constructed in accordance with the present disclosure. The custom settings dialog 400 may include a plurality of settings categories having a plurality of custom settings, which may be user-configurable. For example, the plurality of settings categories may include a next session settings category 404 and a next day settings category 408. Additional settings categories are discussed below and shown in FIG. 5D. The next session settings category 404 may include one or more session goto options 412 having an option title 416, a time selector 420 (operable to set a goto time value for the simulation time) and a reference time 424 to convert a historic market (e.g., stock market) time-zone to a common time-zone, e.g., London Time (Greenwich Mean Time or British Summer Time) or Hong Kong Time to New York Time (i.e., Eastern Time).

In one embodiment, the next session settings category 404 includes a first session goto option 412a having a first option title 416a of "Start of Asian Session (New York Time)", a first reference time 424a of "New York Time" as shown in parentheses of the first option title 416a, for example, and a first time selector 420a having a first goto time value of "19:00"; a second session goto option 412b having a second option title 416b of "Start of London Session (New York Time)" and a second time selector 420b having a second goto time value of "02:00"; and a third session goto option 412c having a third option title 416c of "Start of New York Session (New York Time)" and a third time selector 420c having a third goto time value of "07:00". In one embodiment, the reference time 424 for each of the custom settings may be set in the user profile such that all custom settings for the user have the same reference time 424.

The next day settings category 408 may include one or more session goto options 412 such as a fourth session goto option 412d having a fourth option title 416d, a time selector 420 (shown as a fourth time selector 420d having a fourth goto time value of "17:00") and a reference time 424 (shown as a fourth reference time 424d).

In one embodiment, values for each of the one or more session goto options 412 is stored in the backtesting memory 82, such as in the database 94, and is associated with the user account 76 of the user. In other words, the values for each of the one or more session goto options 412 may be the same between each backtesting session associated with each of the one or more backtesting item 212a-n of the backtesting application 90 (FIG. 4).

In one embodiment, each of the one or more session goto options 412 is created by the user or is prepopulated by the user processor 58 or the backtesting processor 86 on a historic market instrument (e.g., stock, option, or the like) 305 in the session data or time-series data of the historic market instrument 305. In one embodiment, the one or more session goto options 412 are not generated based on live stock data or live foreign exchange data. In one embodiment, the one or more session goto options 412 are not generated based on a data stream of live data. In one embodiment, the one or more session goto options 412 are not generated on a backtesting session-by-backtesting session basis, that is, the one or more session goto options 412 are not different between backtesting session for the same user. In one embodiment, the one or more session goto options 412 are not generated during recording of live stock data. In one embodiment, the one or more session goto options 412 are not generated during playback of the historic market instrument 305.

It should be understood that text names of the next session settings category 404 and the next day settings category 408 are provided for convenience, and in some embodiments, the text names may be the same or different from the text names shown.

In one embodiment, each setting of: the one or more session goto options 412, the next session settings category 404, and the next day settings category 408 may further include an activation indicator 444 operable to indicate whether the particular custom setting is in effect for the particular backtesting session (e.g., has an active/activated state or an inactive/deactivated state). The user, by interacting with the activation indicator 444 associated with a particular custom setting may cause the user processor 58 to activate that particular custom setting or deactivate that particular custom setting. When the particular custom setting is activated, the user may interact with the primary user interface 30 to advance to a time within the particular backtesting session corresponding to that particular custom setting.

That is, the goto menu 350 may only display goto jumps 354 when the activation indicator 444 associated with the custom setting corresponding to the particular goto jump 354 is activated. For example, activation of a first category activation indicator 442a corresponding with the next session settings category 404 causes the user processor 58 to include the Next Session jump 354a in the goto menu 350 shown in FIG. 5A. In this embodiment, because the first category activation indicator 442a is associated with a particular settings category (i.e., the next session settings category 404), the first category activation indicator 442a may be considered a category activation indicator.

As shown in FIG. 5B, the first session goto options 412a includes a second activation indicator 444b being activated; the second session goto options 412b includes a third activation indicator 444c being activated; and the third session goto options 412c includes a fourth activation indicator 444d being deactivated. Thus, upon selection of the Next Session jump 354a in the goto menu 350, the user processor 58 advances the graph 304 of the historic market instrument 305 to the goto time value of the next nearest and activated session goto options 412. The user processor 58 may determine a next nearest goto time value for the "next nearest" session goto options 412 by comparing the simulation time 310 to the goto time values for each session goto options 412 having an activation indicator 444 that is activated and selecting the session goto options 412 having the nearest goto time value that is greater than the simulation time 310.

For example, if the simulation time 310 was "00:01 (UTC)" and the user, interacting with the primary user interface 30 selected the Next Session jump 354*a*, the user processor 58 would cause the graph 304 of the historic market instrument 305 to advance by 6 hour and 59 minutes until the simulation time 310 is "07:00 (UTC)" because 00:01 UTC is one minute after 19:00 New York Time while 02:00 New York Time is the next nearest goto time value of an activated session goto options 412 that is greater than the simulation time 310 of "00:01 (UTC)", thus, the user processor 58 advances to the goto time value of the second session goto options 412*b*. If the simulation time 310 is "07:00 (UTC)" and the user again selects the Next Session jump 354*a*, the user processor 58 would cause the graph 304 of the historic market instrument 305 to advance by 14 hours until the simulation time 310 is "00:00 (UTC)" because the third session goto options 412*c* is deactivated (e.g., not activated) so the next activated session goto options 412 is the first session goto options 412*a* having the goto time value of 19:00 New York Time (i.e., 00:00 (UTC)).

Further, activation of a second category activation indicator 442*b* corresponding with the next day settings category 408 causes the user processor 58 to include the Next Day Open jump 354*b* in the goto menu 350 shown in FIG. 5A. Thus, upon selection of the Next Day Open jump 354*b* in the goto menu 350, the user processor 58 advances the graph 304 of the historic market instrument 305 to the fourth goto time value of the fourth time selector 420*d*.

Figure 5C:
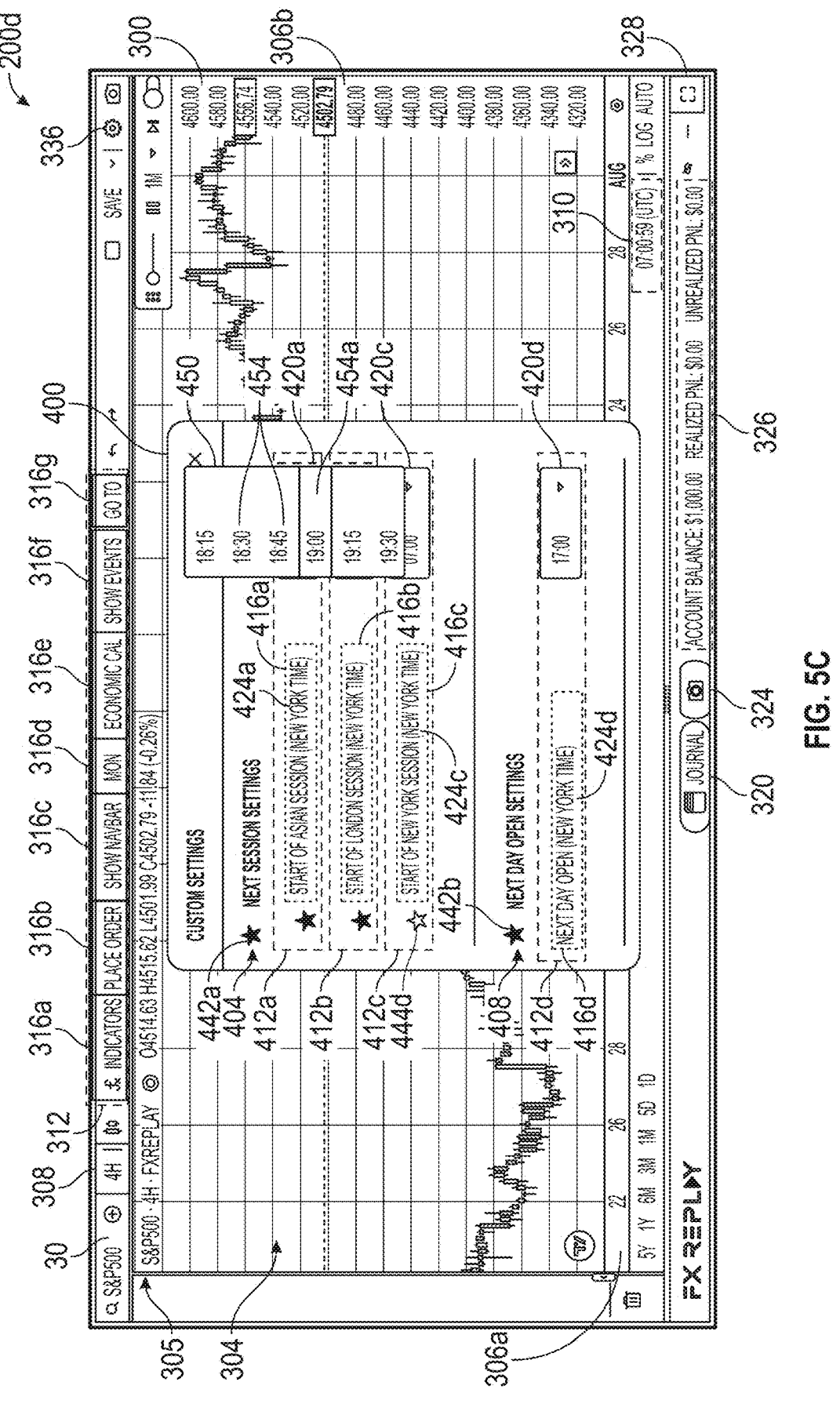
FIG. 5C is an illustration of a screenshot of an exemplary embodiment of the user device displaying a primary user interface with a time selection menu constructed in accordance with the present disclosure.

In one embodiment, upon selection of the time selector 420, the user processor 58 may cause the primary user interface 30 to display a time selection menu as shown in FIG. 5C.

Referring now to FIG. 5C, shown therein is an illustration of a fourth screenshot 200*d* of an exemplary embodiment of the user device 18 displaying the primary user interface 30 with the time selection menu displayed and constructed in accordance with the present disclosure. As shown, the time selection menu may be constructed, for example, as a time dropdown 450 having a plurality of times 454. While the time selection menu is shown as the time dropdown 450, other embodiments of the time selection menu may include any time selector or time picker UI element that enables the user to input a time to the time selector 420 and may include, for example, a number input field or clock-face selector.

In one embodiment, the user may interact with a first time 454*a* having a first goto time value of the time dropdown 450 to cause the user processor 58 to store the first goto time value of the first time 454*a* selected by the user as the goto time value for the corresponding time selector 420. As shown, the user has selected the first goto time value of "19:00" which is then stored as the first goto time value of the first time selector 420*a* (shown in FIG. 5B, for example).

In one embodiment, as shown in FIG. 5C, the time dropdown 450 may be disposed over at least a portion of the custom settings dialog 400.

Figure 5D:
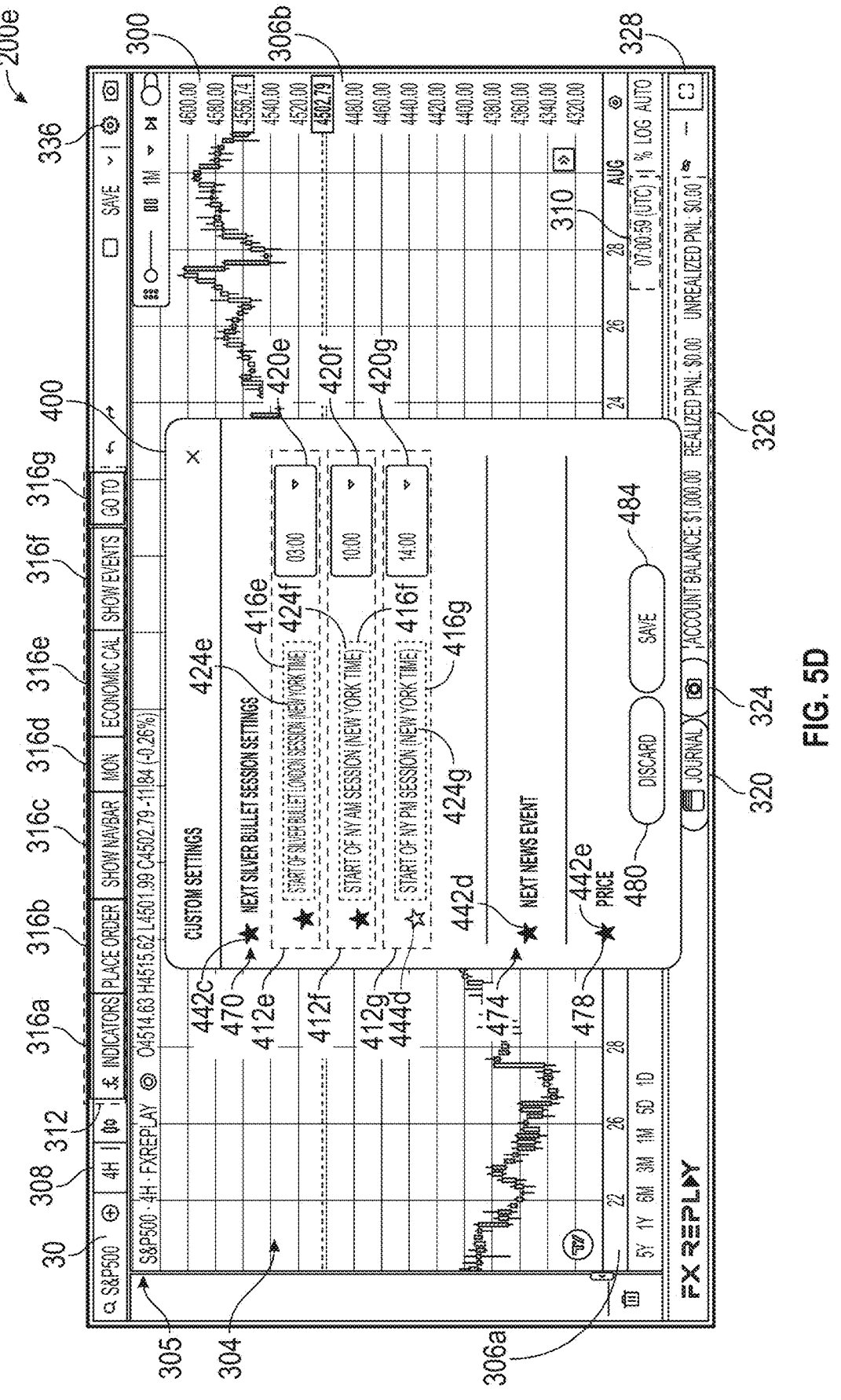
FIG. 5D is an illustration of a screenshot of an exemplary embodiment of the user device displaying a primary user interface with a custom settings dialog constructed in accordance with the present disclosure.

Referring now to FIG. 5D, shown therein is an illustration of a fifth screenshot 200*e* of an exemplary embodiment of the user device 18 displaying the primary user interface 30 with the custom settings dialog 400 displayed and constructed in accordance with the present disclosure. As discussed above, the custom settings dialog 400 may include a plurality of settings categories having a plurality of custom settings. As shown in FIG. 5D, the custom settings dialog 400 further includes a next silver bullet session settings category 470 having a third category activation indicator 442*c*, a next news event category 474 having a fourth category activation indicator 442*d*, and a price category 478 having a fifth category activation indicator 442*e*.

In one embodiment, the next silver bullet session settings category 470 may include one or more session goto options 412*e-g* having an option title 416*e-g*, a time selector 420*e-g* (operable to set a bullet session time) and a reference time 424*e-g* to convert a historic market instrument timezone to a common timezone, as described above. As shown a fifth session goto option 412*e* having the activation indicator 444, a fifth option title 416*e*, with a fifth reference time 424*e*, and a fifth time selector 420*e*; a sixth session goto option 412*f* having the activation indicator 444, a sixth option title 416*f*, with a sixth reference time 424*f*, and a sixth time selector 420*f*; and a seventh session goto option 412*g* having the activation indicator 444, a seventh option title 416*g*, with a seventh reference time 424*g*, and a seventh time selector 420*g*.

In one embodiment, activation of the third category activation indicator 442*c* corresponding with the next silver bullet session settings category 470 causes the user processor 58 to include the Next Silver Bullet Session jump 354*c* in the goto menu 350; activation of the fourth category activation indicator 442*d* corresponding with the next news event category 474 causes the user processor 58 to include the Next News Event jump 354*d* in the goto menu 350; and deactivation of the fifth category activation indicator 442*e* corresponding with the next price category 478 causes the user processor 58 to not include a Next Price jump in the goto menu 350, as shown in FIG. 5A. In this way, the user may interact with each category activation indicator 442 to include or exclude one or more category from the goto menu 350.

In one embodiment, upon selection of the Next News Event jump 354*d* in the goto menu 350, the user processor 58 advances the graph 304 of the historic market instrument 305 to a next time value of a news event time value. For example, news events may be stored in the user memory 66 or in the backtesting memory 82 such as in the database 94, e.g., as a news event paired associated with a news event time value. The time value may be, for example, a timestamp also including a date and/or a time. The user processor 58 accessing the user memory 66 or the backtesting processor 86 accessing the backtesting memory 82 or the database 94 may retrieve a news event having a news event time value greater than the simulation time 310. The news event time value of the retrieved news event may be selected as the next time value such that the user processor 58 advances the graph 304 of the historic market instrument 305 to the next time value of the news event time value of the retrieved news event.

In one embodiment, the custom settings dialog 400 may further include a discard input 480 and a save input 484, each of the discard input 480 and the save input 484 constructed as a button, for example. In one embodiment, upon selection of the discard input 480, the user processor 58 may discard any change made within the custom settings dialog 400 from a time that the custom settings dialog 400 was opened, if any changes were made, and may close the custom settings dialog 400. In one embodiment, upon selection of the save input 484 the user processor 58 may save custom settings, such as a state of each activation indicator 444 and a time value from each time selector 420. The user processor 58 may save the custom settings with the user's user account 76 in the user memory 66, may transmit the custom settings, such as via the network 26, to the backtesting processor 86, or may otherwise associate the user account 76 with the custom settings. The backtesting processor 86 may receive the custom settings and save the custom settings with the user's user account 76 in the backtesting memory 82, such as in the database 94, or may otherwise associate the user account 76 with the custom settings.

In one embodiment, the technical solutions provided herein, by associating the custom settings with the user account (and, e.g., not with a particular backtesting session or within the values of the historic market instrument 305) and instead dynamically calculating the next nearest goto time value as requested by the user 14, overcome a technical problem of high memory requirements of storing references to specific instance in time for each historic market instrument. For example, requiring the user to generate references to specific instances in the simulation time for each backtesting session would require storage of each of those references for each user—and, when multiple users interact with such a system, the storage requirements to store each pre-determined reference to specific instances in time for each historic market instrument would be immense. Furthermore, the technical solutions provided herein, by associating the custom settings with the user account, overcome a technical problem of increased processing overhead in one or more of the processors 58, 86 caused by processing all historic market instruments and generating references to specific instances in the simulation time for each historic market instrument. Thus, in one embodiment, by not generating references to specific instances in the simulation time for all historic data, or as real-time data is received, and instead dynamically calculating the next nearest goto time value as requested by the user 14, the efficiency of the user processor 58 and the backtesting processor 86 may be increased and network traffic on the network 26 may be reduced, thereby further causing the primary user interface 30 to be more responsive to user inputs.

Figure 5E:
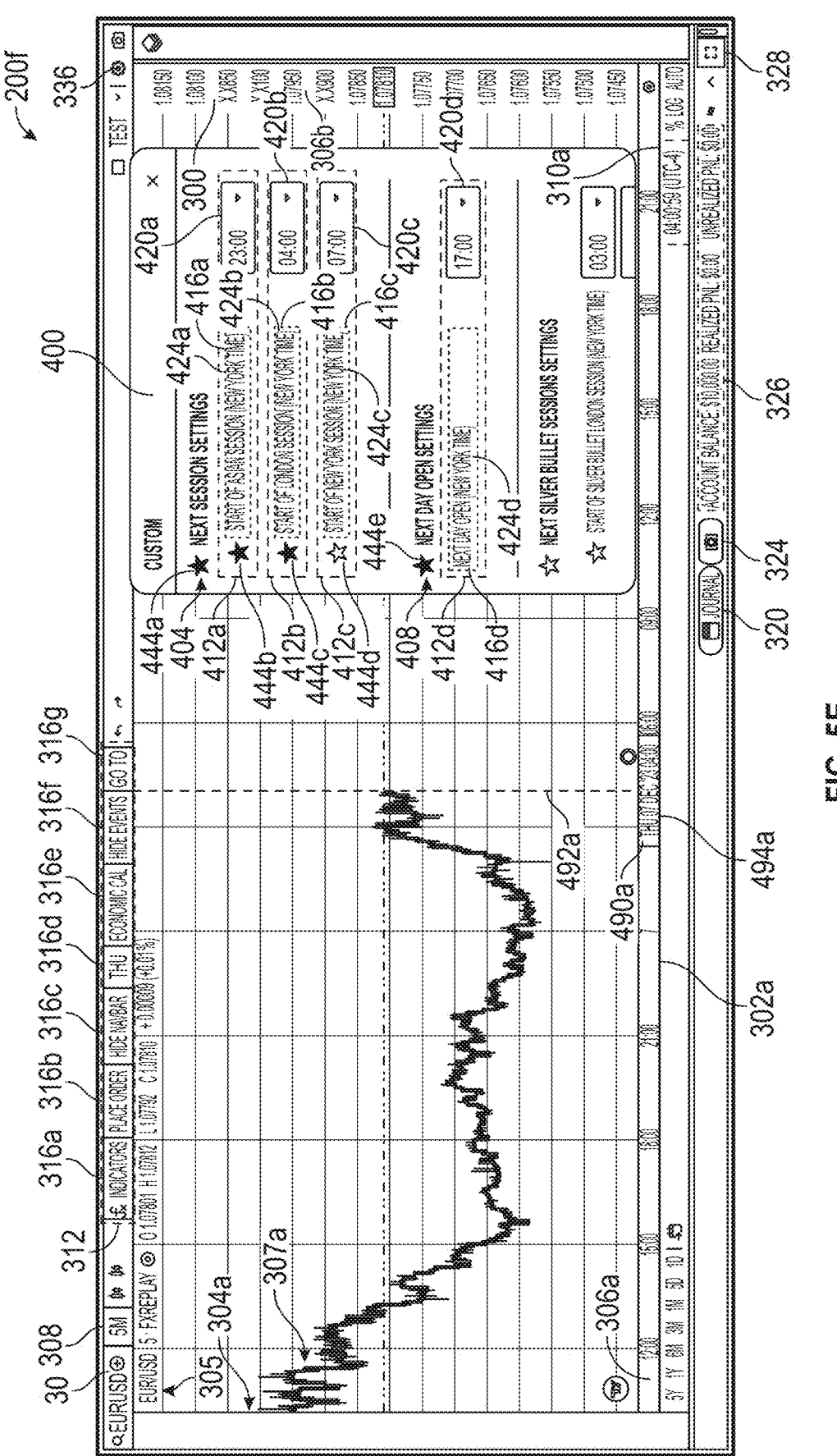
FIG. 5E is an illustration of a screenshot of an exemplary embodiment of the user device displaying a primary user interface with the backtesting session view at a first instant in simulation time and constructed in accordance with the present disclosure.
Figure 5F:
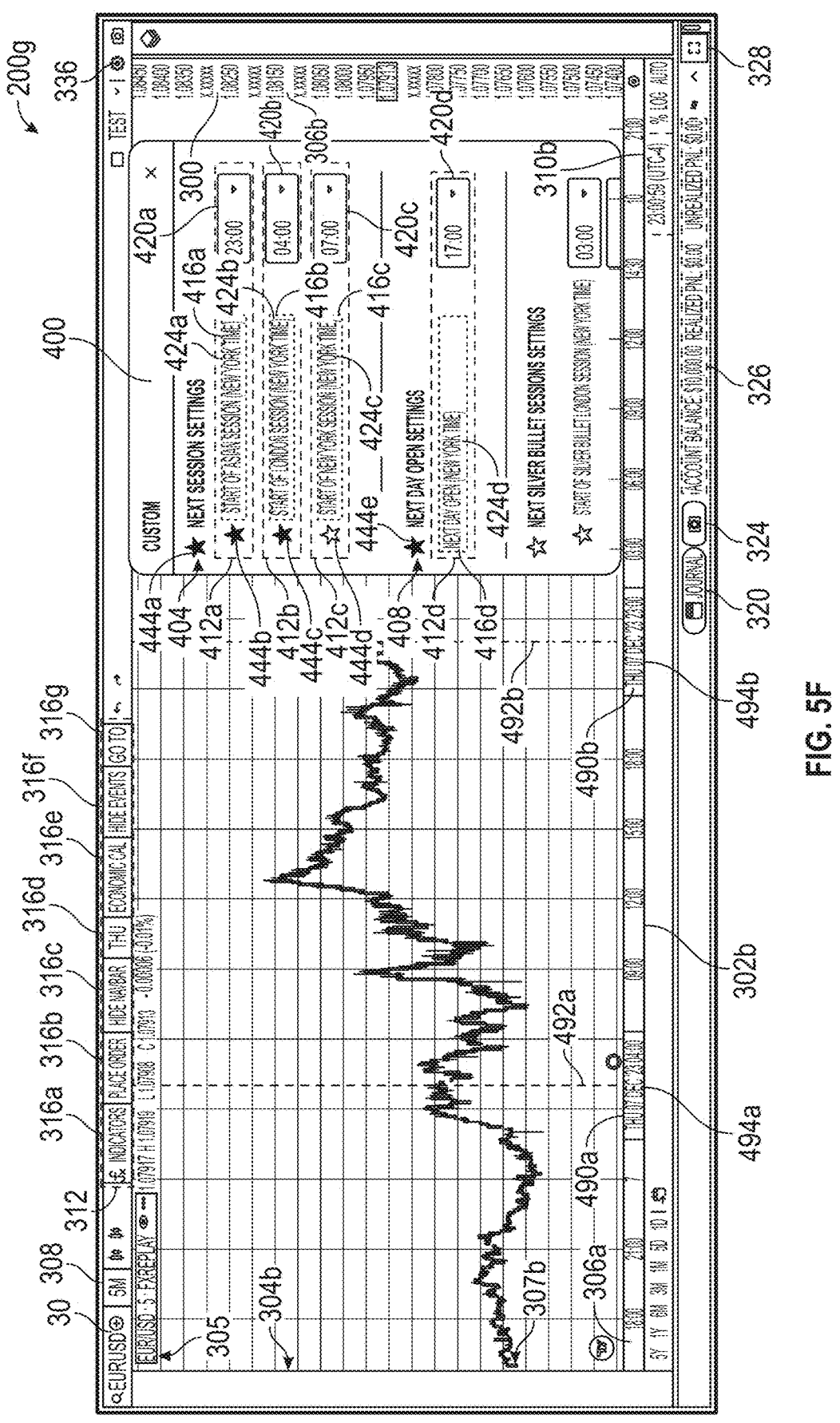
FIG. 5F is an illustration of a screenshot of an exemplary embodiment of the user device displaying a primary user interface with the backtesting session view of FIG. 5E at a second instant in simulation time and constructed in accordance with the present disclosure.

Referring now to FIGS. 5E-F in combination, shown therein are illustrations of a sixth screenshot 200f and a seventh screenshot 200g of exemplary embodiments of the user device 18 displaying the primary user interface 30 with the backtesting session view 300 at differing instants in simulation time 310, constructed and displayed in accordance with the present disclosure. Generally, the backtesting session view 300 displays a backtesting session, such as the backtesting session associated with a particular backtesting item 212 selected by the user 14 from the backtesting dashboard 204.

As shown, the backtesting session view 300 includes a first chart 302a having a first graph 304a at a first instant in simulation time 310a (FIG. 5E) and a second chart 302b having a second graph 304b at a second instant in simulation time 310b (FIG. 5F), such as a candlestick line graph. Each of the graphs 304a, 304b may show time-series values 307 of the historic market instrument 305 (e.g., actual stock data for a stock, financial market, or foreign exchange market that is at least one market-day old, or from a prior market-day) up to the particular instant in simulation time 310. As shown, the first graph 304a of the first chart 302a shows first time-series values 307a of the historic market instrument 305 up to the first instant in simulation time 310a and the second graph 304b of the second chart 302b shows second time-series values 307b of the historic market instrument 305 up to the second instant in simulation time 310b.

The historic market instrument 305 may be, for example, a time-series data having the market instrument value associated with a particular time value. The historic market instrument 305 may be provided with time granularity 308 within the graph 304 where the time granularity 308 is a time delta between consecutive market instrument values of the time-series values 307 in the time-series data. For example, the historic market instrument 305 may have a time granularity 308 of 5 minutes, resulting in the time-series data providing market instrument time-series values in 5-minute increments. In one embodiment, the backtesting processor 86 may calculate the market instrument time-series values for a particular time granularity 308.

In one embodiment, the backtesting processor 86 may retrieve the time-series values 307 of the historic market instrument 305 from the backtesting memory 82, such as from the database 94. In one embodiment, the database 94 storing the historic market instrument values is a non-relational database and/or a time-series database. The time-series values 307 of the historic market instrument 305 may be, for example, stored with, or associated with, the session data.

In one embodiment, the graph 304 may show historic market instrument values for the historic market instrument 305 that have a time value at, or before, a simulation time 310. As shown in FIG. 5E, the simulation time 310a is shown as "04:00:59 (UTC-4)" while, as shown in FIG. 5F, the simulation time 310b is shown as "23:00:59 (UTC-4)."

In one embodiment, the primary user interface 30 with the backtesting session view 300 loaded with session data of the associated backtesting session may show the time-series values 307 for the historic market instrument 305 only up to the first time-series values 307a of the market instrument having time-series values at or before the simulation time 310a of 04:00:59 (UTC-4), and may not, for example, display the market instrument time-series values having time-series values 307 greater than the simulation time 310a. In one embodiment, the backtesting processor 86 may provide one or more session timestamp indicator 490 on the chart 302, for example, as a first session timestamp indicator 490a in FIG. 5E and a second session timestamp indicator 490b further shown in FIG. 5F. Each of the session timestamp indicators 490 correspond to a particular one of the session goto options 412, e.g., correspond to a time value selected in the corresponding time selector 420, and provides an indication corresponding to a particular session time on the axis of abscissas 306a. For example, as shown in FIG. 5E, the backtesting processor 86 provides the first session timestamp indicator 490a on the first chart 302a when the simulation time 310 reaches and/or passes the time value of the second time selector 420b. Further, the backtesting processor 86 may provide the second session timestamp indicator 490b (FIG. 5F) on the second chart 302b when the simulation time 310 reaches and/or passes the time value of the second time selector 420b.

In some embodiments, such as shown in FIG. 5F, the backtesting processor 86 provides the first session timestamp indicator 490a on the second chart 302b when the simulation time 310 reaches and/or passes the time value of the second time selector 420b and provides the second session timestamp indicator 490b on the second chart 302b when the simulation time 310 reaches and/or passes the time value of the second time selector 420b, such that both the first session timestamp indicator 490a and the second session timestamp indicator 490b are shown on the same second chart 302b.

In one embodiment, each session timestamp indicator 490 includes both a graphic indicator 492 and a textual indicator 494. The backtesting processor 86 may provide the graphic indicator 492 as a graphical symbol on the chart 302. As shown in FIG. 5E, the backtesting processor 86 may cause the primary user interface 30 to include a first graphic indicator 492a and a first textual indicator 494a as the first session timestamp indicator 490a such that the backtesting processor 86 aligns the first graphic indicator 492a on the first chart 302a with the axis of abscissas 306a at the time value of the second time selector 420b to indicate a position within the first time-series values 307a of the first graph 304a corresponding with the time value of the second time selector 420b. The first textual indicator 494a may likewise be provided by the backtesting processor 86 and indicative of the time value of the second time selector 420b and displayed, for example, as a timestamp, a date-stamp, or a date/timestamp, e.g., depending on the time granularity 308, and may be provided in any textual format indicative of a particular time value. In some embodiments, the graphic indicator 492 (such as the first graphic indicator 492a) may be constructed as a line (such as a formatted line, or dashed line) extending from a particular time-value along the axis of abscissas 306a to a particular value of the time-series values 307 of the graph 304, and may extend beyond the particular value.

Similarly, as shown in FIG. 5F, the backtesting processor 86 may cause the primary user interface 30 to include a second graphic indicator 492b and a second textual indicator 494b as the second session timestamp indicator 490b such that the backtesting processor 86 aligns the second graphic indicator 492b on the second chart 302b with the axis of abscissas 306a at the time value of the first time selector 420a to indicate a position within the second time-series values 307b of the second graph 304b corresponding with the time value of the first time selector 420a.

Referring to FIGS. 5E-F in combination, in one embodiment, upon the user interacting with the primary user interface 30 and selecting the Next Session jump 354a, the user processor 58 would cause the first graph 304a of the historic market instrument 305, shown at the simulation time 310a of "04:00:59 (UTC-4)," which is after the time value of the second time selector 420b, to advance to (or until) the simulation time 310b of "23:00:59 (UTC-4)" because the simulation time 310b is the next nearest goto time value of an active session goto option 412 (as indicated by the activation indicator 444 and/or the category activation indicator 442) that is greater than the simulation time 310a. Therefore, the user processor 58 advances to the goto time value of the first time selector 420a of the first session goto option 412a. In other words, even though the third time selector 420c has a time value intermediate the second time selector 420b and the first time selector 420a, the user processor 58 continues advancing past the time value of the third time selector 420c because the activation indicator 444d has an inactive/deactivated state.

In this way, the user processor 58 advances the graph 304 of the historic market instrument 305 to respective second simulation time based upon a particular jump 354 selected by the user 14. By receiving the historic market instrument data from the backtesting device 22 extending beyond the first simulation time, and in some embodiments, up to the timeframe of the backtesting session, the user processor 58 may increase efficiency of the backtesting processor 86 and increase efficiency of the network 26 by reducing network overhead that would otherwise be caused by multiple or repeated jumps requested by the user 14. Further, in some embodiments, the user processor 58 advances the graph 304 of the historic market instrument 305 to respective second simulation time based upon a particular jump 354 selected by the user 14 without requesting additional historic market instrument from the backtesting device after selection of the Next Session jump 354a in the goto menu 350.

In one embodiment, the user processor 58 may advance from the second simulation time to the first simulation time, e.g., advance the backtesting simulation backwards in time, until the value of the historic market instrument reaches the target price and selects the timestamp of the historic market instrument at the target prices as the first simulation time. The user processor 58 further draws, in the backtesting session view on the output device, the historic market instrument mapped on the graph up to the second simulation time. The user processor 58 may indicate the time period between the first simulation time and the second simulation time on the graph 304, such as, with a dashed line. In this way, the primary user interface 30 may support bidirectional navigation of the historic market instrument within the graph 304, e.g., by allowing the first simulation time to advance forward or backward based on the particular jump 354. In one embodiment, the user processor 58 may advance from the second simulation time to the first simulation time, e.g., advance the backtesting simulation backwards in time, to a particular time selected by the user 14, or, for example, to the beginning of the simulation timeframe.

Figures 6A, 6B:
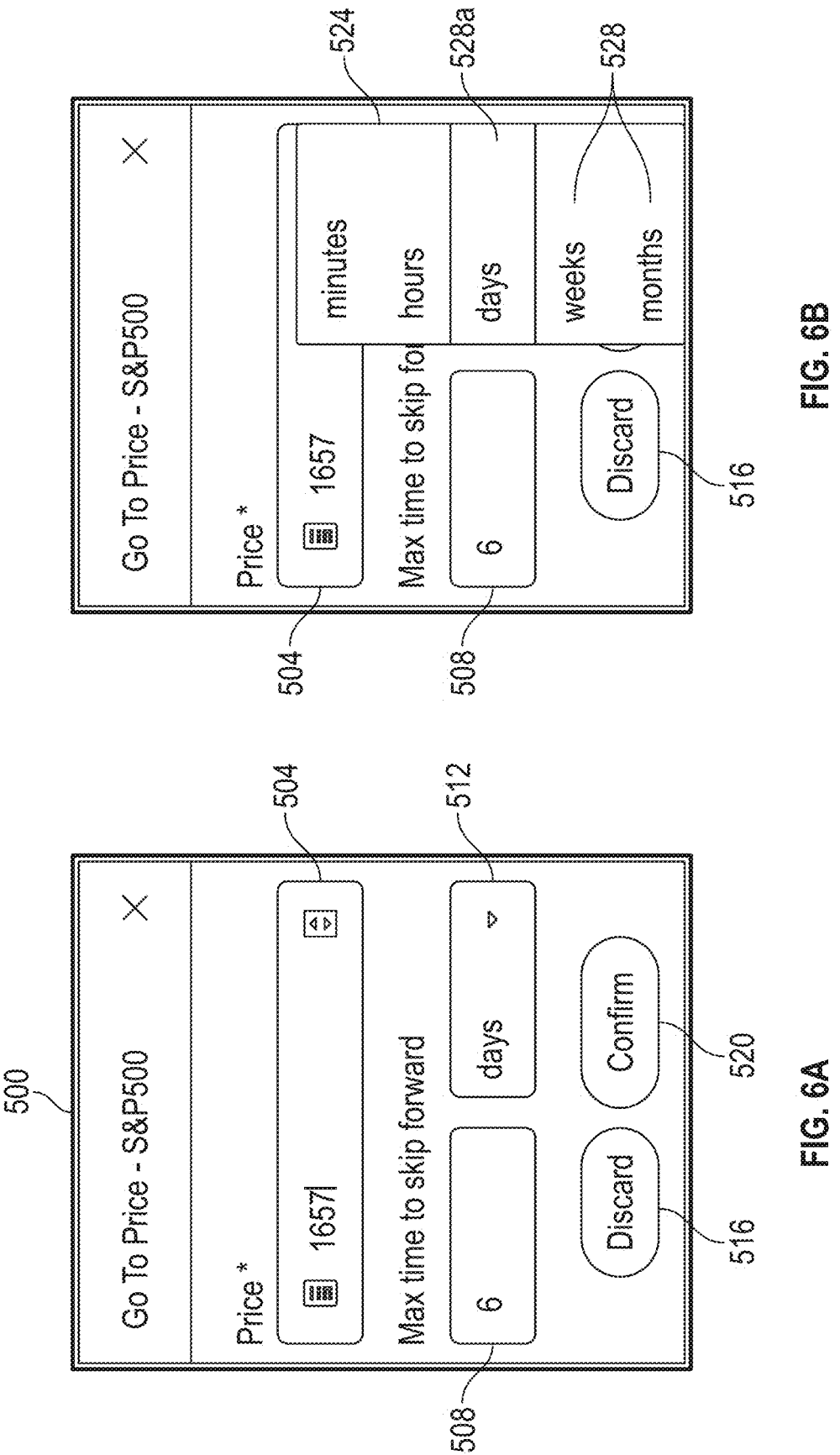
FIG. 6A is a diagram of an exemplary embodiment of a goto price dialog constructed in accordance with the present disclosure.
FIG. 6B is a diagram of an exemplary embodiment of the goto price dialog of FIG. 6A having a time unit selector and constructed in accordance with the present disclosure.

Referring now to FIGS. 6A-B, in combination, shown therein are diagrams of an exemplary embodiment of a goto price dialog 500 constructed in accordance with the present disclosure. In one embodiment, the fifth category activation indicator 442e corresponding with the next price category 478 is activated (shown in FIG. 5D) and causes the user processor 58 to include a Next Price jump in the goto menu 350 (not shown). Upon selection of the Next Price jump in the goto menu 350, the backtesting processor 86, responsive to the selection, e.g., from the user interacting with the primary user interface 30 on the user device 18, may cause the primary user interface 30 to display the goto price dialog 500.

As shown in FIGS. 6A-B, the goto price dialog 500 comprises a price input 504, a max time input 508, a time unit input 512, a discard button 516 and a confirm button 520. The price input 504 may receive a target price from the user interacting with the primary user interface 30, e.g., via the user device 18. The user may further provide a maximum skip time value in the max time input 508 and a time unit in the time unit input 512. In one embodiment, upon selection of the time unit input 512, the user is provided with a time unit selector 524 having a plurality of time units 528. As shown in FIGS. 6A-B, the user has selected a first time unit 528a of "days", such that the maximum skip time value, shown as "6", has units of the selected time unit 528, shown as "days." Thus, the user processor 58 may determine that the maximum skip time is "6 days."

In one embodiment, upon selection of the discard button 516, the user processor 58 closes the goto price dialog 500 without advancing the graph 304 (FIG. 5A). In one embodiment, the user processor 58 may further communicate with the backtesting processor 86 to indicated that the user intends to discard or cancel the goto price dialog 500.

In one embodiment, upon selection of the confirm button 520, the user processor 58 closes the goto price dialog 500 and advances the graph 304 (FIG. 5A) until the first one of either: the market instrument value of the historic market instrument 305 reaches the target price input into the price input 504; or the maximum skip time value from the simulation time 310 is reached. In one embodiment, the user processor 58 may further communicate with the backtesting processor 86 to indicate that the user intends to proceed based on the goto price dialog 500. In one embodiment, upon selection of the confirm button 520, if the max time input 508 is left blank (or in some embodiments, provided with a value of "0"), the user processor 58 closes the goto price dialog 500 and advances the graph 304 (FIG. 5A) until the market instrument value of the historic market instrument 305 reaches the target price input into the price input 504 or until the session is finished, e.g., the backtesting session has run through the entirety of the timeperiod or the timeframe that the backtesting session includes or is executed over, as indicated by the period label 224a, FIG. 4.

Figure 7:
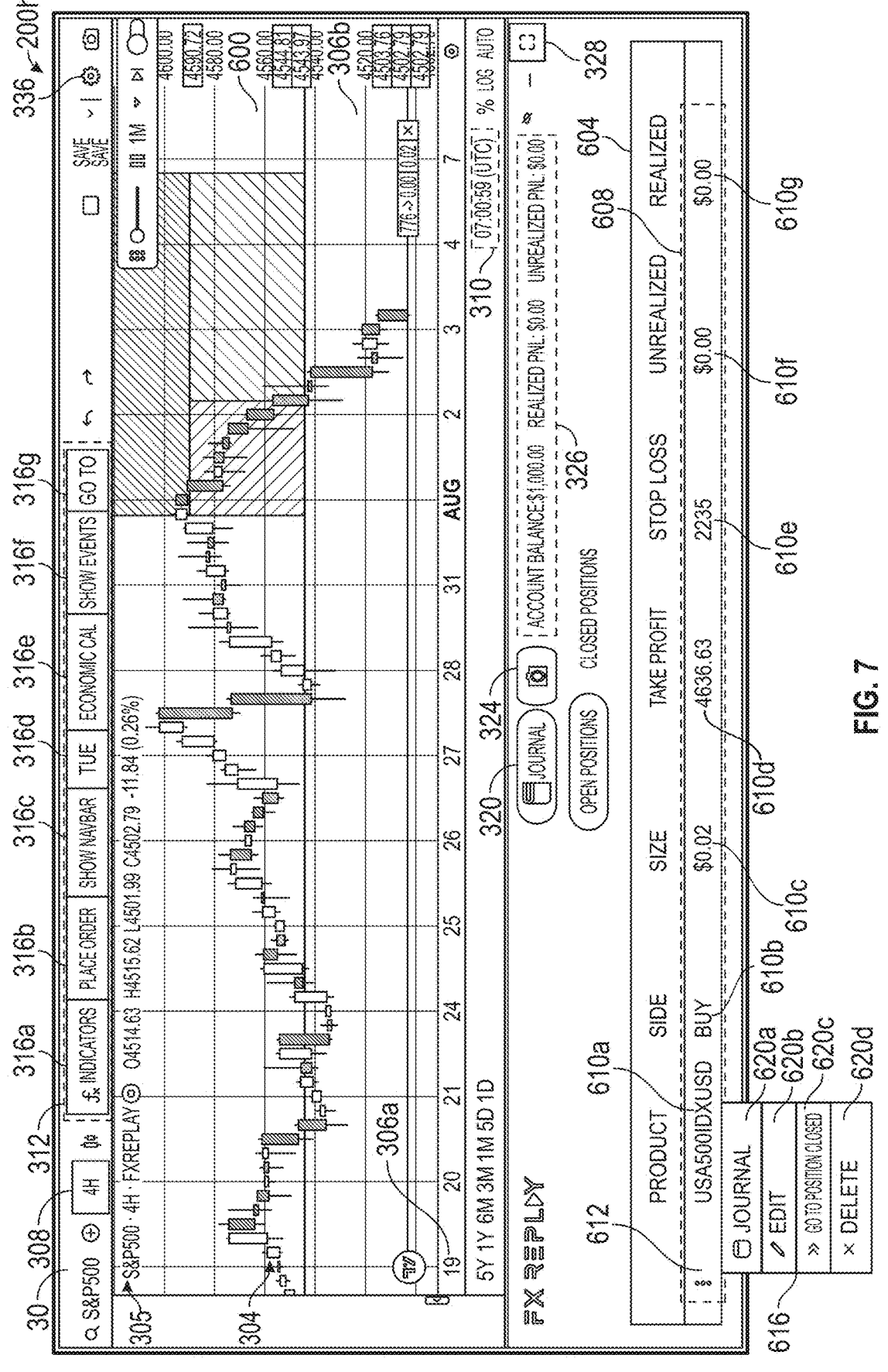
FIG. 7 is a screenshot of an exemplary embodiment of the user device displaying the primary user interface with another backtesting session view constructed in accordance with the present disclosure.

Referring now to FIG. 7, shown therein is an illustration of an eighth screenshot 200h of an exemplary embodiment of the user device 18 displaying the primary user interface 30 with a backtesting session view 600 displayed and constructed in accordance with the present disclosure. Generally, the backtesting session view 600 is constructed in accordance with the backtesting session view 300 except that the backtesting session view 600 shows the historic market instrument 305 over a shorter time period (as indicated by values on the axis of abscissas 306a). Further shown in the backtesting session view 600 is a ribbon 604 showing one or more open position, such as an open position 608 corresponding with a particular open position the user has taken within the associated backtesting session of the particular backtesting item 212. The open position 608 may be shown, for example, as a row in a table as is shown in FIG. 7, however, the open position 608 may be shown in other formats as well. The open position 608 may include one or more position property 610 such as a product value 610a, a side value 610b, a size value 610c, a take profit value 610d, a stop loss value 610e, an unrealized gain value 610f, and a realized gain value 610g.

The open position 608 may include a menu button 612. The user processor 58 may receive a selection of the menu button 612 from the user device 18, such as caused by the user interacting with the menu button 612 on the primary user interface 30, and, responsive to such interaction, display a position context menu 616 having one or more context option 620 (shown as context options 620a-d). In one embodiment, upon selection of a first context option 620a (shown as being a "journal" option), the user processor 58 may create a journal entry as described above. Upon selection of a second context option 620b (shown as being an "edit" option), the user processor 58 may provide one or more interface to enable the user to edit position information. Upon selection of a third context option 620c (shown as being a "GO TO POSITION CLOSED" option, e.g., a position close jump), the user processor 58 may advance the simulation time 310 (and thus the graph 304 of the historic market instrument 305 in the chart 302) until the position value reaches either the stop loss value 610e or the take profit value 610d, or until the simulation timeframe of the backtesting session ends. Upon selection of a fourth context option 620d (shown as being a "delete" option), the user processor 58 may remove the open position 608 from the backtesting session of the backtesting item 212, for example, by deleting the open position data and properties from the user memory 66, causing the open position data to be deleted from the backtesting memory 82 or the database 94, e.g., by the backtesting processor 86, or causing the open position 608 to be marked as deleted in the user memory 66, the backtesting memory 82, or the database 94, for example. In one embodiment, when the simulation timeframe of the backtesting session ends, the user 14 may be presented on the user device 18 with a session-ended dialog, at which point the user 14 may be provided with an option to close the position or to leave the position open.

In one embodiment, upon selection of the third context option 620c (shown as being a "GO TO POSITION CLOSED" option, e.g., a position close jump), the user processor 58 may search for a next nearest value of the historic market instrument having a timestamp greater than the simulation time 310 for a forward advance (or lesser than the simulation time 310 for a backwards advance) causing the position value to reach either the stop loss value 610e or the take profit value 610d.

In one embodiment, the user processor 58 may constrain the search to the simulation timeframe. In other embodiments, the user processor 58 may constrain the search to a maximum search window, such as one year, one quarter, one month, one week, one day, one hour, and/or the like, or a combination of one or more thereof. In one embodiment, the user processor 58 may receive the historic market instrument data corresponding to the simulation timeframe, or, in some embodiments, may receive only the historic market instrument data corresponding to the simulation time through the maximum search window. Optionally, the maximum search window extends both before and after the simulation time within the simulation timeframe, e.g., if the maximum search window is two weeks, the received historic market instrument data may have timestamp values of between two weeks before and two weeks after the simulation time. In this way, for example by receiving a portion of the historic market instrument data corresponding to less than the entire simulation time frame, the user device 18 may reduce a number of calls to the backtesting device 22, thereby increasing efficiency of communication between the user device 18 and the backtesting device 22 and decreasing latency of the primary user interface 30 while the user processor 58 processes goto jumps 354. Further, by constraining search range within a (user-defined) maximum search window, efficiency of the user processor 58 may be increased by preventing excessive scanning beyond the backtesting session.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A backtesting system, comprising:
    a backtesting device, comprising:
        a first processor; and
        a first memory comprising a first non-transitory processor-readable medium storing a user account, session data, and processor-executable instructions that when executed by the first processor, causes the first processor to:
            generate a backtesting session view and cause a second processor of a user device to display the backtesting session view on an output device for a backtesting session having the session data and comprising a historic market instrument mapped on a graph, the graph having an axis of abscissas corresponding to a timestamp of the historic market instrument and an axis of ordinates corresponding to a market instrument value of the historic market instrument, the backtesting session view having a first simulation time and displaying the historic market instrument drawn on the graph up to the first simulation time, the session data having a simulation timeframe and market instrument values with timestamps beyond the first simulation time;

transmit the backtesting session view with the backtesting session having the session data to the user device; and update the session data associated with the user account with a second simulation time received from an update signal; and the user device, different from the backtesting device, comprising:

the output device;

an input device operable to receive one or more input from a user having a user account;

the second processor; and a second memory comprising a second non-transitory processor-readable medium storing processor-executable code that when executed by the second processor causes the second processor to:

receive the backtesting session view with the backtesting session having the session data;

receive a first input indicative of the user selecting a goto jump from a goto menu, each goto jump associated with at least one session goto option stored in the second memory and having an activation indicator and a goto time value;

determine a next nearest goto time value of the at least one session goto option associated with the selected goto jump, the next nearest goto time value being after the first simulation time;

advance the first simulation time until the first simulation time is equal to a second simulation time being a next nearest goto time value of the at least one session goto option associated with the selected goto jump;

transmit the update signal having the second simulation time; and draw, in the backtesting session view on the output device, the historic market instrument mapped on the graph up to the second simulation time.

2. The backtesting system of claim 1, wherein the goto menu includes one or more goto jumps, the one or more goto jumps being one or more of: a next session jump, a next day open jump, a next silver bullet session jump, a previous significant event jump comprising a predefined trading condition including one or more of: a high volatility spike, liquidity sweep, a major support interaction, and a major resistance interaction, and a session-defined event jump comprising a jump target based on a user-specified trading session or time-based condition.

3. The backtesting system of claim 1, wherein the instructions to advance the first simulation time further include instructions to advance the first simulation time until the first simulation time is equal to the second simulation time, the second simulation time being the next nearest goto time value of the at least one session goto option having the activation indicator of active and associated with the selected goto jump.

4. The backtesting system of claim 1, wherein the instructions to advance the first simulation time further include instructions to advance the first simulation time until the first simulation time is equal to the second simulation time, wherein the second simulation time being within the simulation timeframe and prior to the first simulation time.

5. The backtesting system of claim 1, wherein the first memory further comprises processor-executable instructions that cause the first processor to further:

cause the user device to display on the output device, the goto menu having the one or more goto jumps, wherein each goto jump is categorized under a user-configurable settings category, each goto jump being associated with a category activation indicator of a particular settings category having an active state, and the goto menu further including a custom settings menu selection operable to receive a second input from the user;

in response to the second input from the user, display on the output device a custom settings dialog having one or more settings categories including the particular settings category, each settings category associated with the category activation indicator and the one or more session goto options comprising an option activation indicator and an option name;

upon selection of at least one of the category activation indicators, store a category indicator state in the memory associated with the user account, the associated settings category, and the associated goto jump, the category indicator state being one of the active state and an inactive state; and in response to a change in the category indicator state, update the goto menu on the output device to include the one or more goto jumps having the active state.

6. The backtesting system of claim 5, wherein the one or more session goto options further comprise a time selector, and the second memory further comprises processor-executable instructions that cause the second processor to:

upon selection of a time value of the time selector of a particular session goto option of a particular goto jump, store the time value as the goto time value of the particular goto option of the particular goto jump.

7. The backtesting system of claim 5, wherein the first memory further comprises processor-executable instructions that cause the first processor to:

advance the first simulation time until the first simulation time is equal to the second simulation time being the next nearest goto time value by selecting all session goto options having the activation indicator of activated as candidate goto options, sorting the candidate goto options by the goto time value for each candidate goto option, and selecting the candidate goto option having the goto time value immediately following the first simulation time as the second simulation time.

8. The backtesting system of claim 1, wherein the second processor is operable to advance the first simulation time to the second simulation time without requesting historic market instrument from the backtesting device after receiving the first input.

9. A user device, comprising:

an input device operable to receive an input from a user;

an output device;

a processor in communication with the input device and the output device; and a memory comprising a non-transitory processor-readable medium storing processor-executable instructions that when executed by the processor, causes the processor to:

generate a backtesting session view for a backtesting session displayed on the output device and comprising a historic market instrument having a time-series data of a market instrument value and a timestamp mapped on a graph, the graph having an axis of abscissas corresponding to a time and an axis of ordinates corresponding to a value of the historic market instrument, the backtesting session view having a first simulation time and displaying the historic market instrument mapped on the graph up to the first simulation time, the backtesting session having a simulation timeframe;

receive a first input, via the input device, indicative of the user selecting a goto jump being a price jump, the price jump having a target price;

advance the first simulation time until the value of the historic market instrument reaches the target price, and selecting the timestamp of the historic market instrument as a second simulation time; and draw, in the backtesting session view on the output device, the historic market instrument mapped on the graph up to the second simulation time.

10. The user device of claim 9, wherein the instructions that cause the processor to advance the first simulation time further cause the processor to:

advance the first simulation time within a maximum search window until the value of the historic market instrument reaches the target price, and selecting the timestamp of the historic market instrument as the second simulation time; and wherein the maximum search window is less than or equal to the simulation timeframe.

11. The user device of claim 10, wherein the instructions that cause the processor to advance the first simulation time further cause the processor to:

advance the first simulation time by searching the values of the historic market instrument for a particular value meeting the target price, and selecting a respective timestamp of that particular value as the second simulation time.

12. The user device of claim 9, wherein the memory further comprises processor-executable instructions that cause the processor to further:

receive the first input indicative of the user selecting the goto jump being the price jump, the price jump having the target price and a maximum skip time; and advance the first simulation time to a second simulation time until at least one of: the value of the historic market instrument reaches the target price, and the first simulation time has been advanced by the maximum skip time.

13. The user device of claim 9, wherein the historic market instrument comprises a time-series data of a market instrument value and a timestamp; and wherein the instruction to advance the first simulation time further includes instructions that cause the processor to:

identify a next time-series datum having the timestamp after the first simulation time and having the market instrument value equal to, or greater than, the target price; and update the second simulation time to the timestamp of the identified next time-series datum.

14. A user device, comprising:

a processor; and a memory comprising a non-transitory processor-readable medium storing processor-executable instructions that when executed by the processor, causes the processor to:

generate a backtesting session view for a backtesting session comprising a historic market instrument having a time-series data of a market instrument value and a timestamp mapped on a graph, the graph having an axis of abscissas having a time and an axis of ordinates having a value, the backtesting session view having a first simulation time and displaying the historic market instrument mapped on the graph up to the first simulation time such that the market instrument value for each timestamp on the axis of abscissas through the first simulation time is provided on the graph, the backtesting session having a simulation timeframe;

receive a first input indicative of a user selecting a goto jump being a position close jump, the position close jump being associated with a position taken in the historic market instrument, the position being associated with at least one position value;

advance the first simulation time until a particular market instrument value of the historic market instrument meets the at least one position value, the particular market instrument value being associated with a particular timestamp, and selecting the particular timestamp of the historic market instrument as a second simulation time; and draw, in the backtesting session view, the historic market instrument mapped on the graph up to the second simulation time such that the market instrument value for each timestamp on the axis of abscissas through the second simulation time is provided on the graph.

15. The user device of claim 14, wherein the at least one position value includes at least one of: a take-profit value and a stop-loss value.

16. The user device of claim 14, wherein the instructions further include instructions to cause the processor to:

receive the time-series data of the market instrument value, the time-series data including the market instrument values of the historic market instrument within the simulation timeframe.

17. The user device of claim 14, wherein the instructions that cause the processor to advance the first simulation time further cause the processor to:

advance the first simulation time within a maximum search window until the particular market instrument value of the historic market instrument meets the at least one position value, the particular market instrument value being associated with the particular timestamp, and selecting the particular timestamp of the historic market instrument as the second simulation time; and wherein the maximum search window is less than or equal to the simulation timeframe.

18. The user device of claim 17, wherein the instructions further include instructions to cause the processor to:

receive the time-series data of the market instrument values, the time-series data including the market instrument values of the historic market instrument within the maximum search window.

19. The user device of claim 14, wherein the instructions that cause the processor to advance the first simulation time further cause the processor to:

advance the first simulation time by sequentially searching, from the first simulation time, the market instrument values of the historic market instrument for the particular market instrument value meeting at least one position value, and selecting a respective timestamp of that particular market instrument value as the second simulation time.

* * * * *